United States Patent
Roberts

(10) Patent No.: US 9,432,115 B2
(45) Date of Patent: Aug. 30, 2016

(54) APPARATUS, SYSTEM AND METHOD OF COMMUNICATING POSITIONING TRANSMISSIONS

(71) Applicant: Intel Corporation, Santa Clara, CA (US)

(72) Inventor: Richard D. Roberts, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 16 days.

(21) Appl. No.: 14/129,303

(22) PCT Filed: Jul. 10, 2013

(86) PCT No.: PCT/US2013/049825
§ 371 (c)(1),
(2) Date: Dec. 26, 2013

(87) PCT Pub. No.: WO2012/005912
PCT Pub. Date: Jan. 15, 2015

(65) Prior Publication Data
US 2015/0016824 A1 Jan. 15, 2015

(51) Int. Cl.
*H04B 10/00* (2013.01)
*H04B 10/116* (2013.01)
*H04B 10/112* (2013.01)

(52) U.S. Cl.
CPC ......... *H04B 10/116* (2013.01); *H04B 10/1129* (2013.01)

(58) Field of Classification Search
CPC .. H04B 10/116; H04B 10/54; H04B 10/548; H04B 10/556
See application file for complete search history.

(56) References Cited

U.S. PATENT DOCUMENTS

| 5,081,344 A | 1/1992 | Misawa |
| 5,119,104 A | 6/1992 | Heller |
| 5,305,134 A | 4/1994 | Tsushima et al. |

(Continued)

FOREIGN PATENT DOCUMENTS

| JP | 05-034436 | 2/1993 |
| WO | 2011/128739 | 10/2011 |

(Continued)

OTHER PUBLICATIONS

International Search Report and Written Opinion for PCT Patent Application No. PCT/US2011/065866, mailed on Sep. 14, 2012, 15 pages.

(Continued)

*Primary Examiner* — Dzung Tran
(74) *Attorney, Agent, or Firm* — Shichrur & Co.

(57) ABSTRACT

Some demonstrative embodiments include apparatuses, systems and/or methods of communicating positioning transmissions. For example, an apparatus may include a controller to control at least one light transmitter to transmit from a mobile object Intensity-Modulated (IM) optical signals including On-Off-Keying (OOK) signals of one or more positioning transmissions, the controller is to control the at least one light transmitter to transmit from the mobile object one or more first OOK signals over a first ranging frequency, and to transmit from the mobile object one or more second OOK signals over a second ranging frequency, the second ranging frequency is different from the first ranging frequency.

30 Claims, 11 Drawing Sheets

(56) References Cited

U.S. PATENT DOCUMENTS

| | | | |
|---|---|---|---|
| 5,508,917 | A | 4/1996 | Siegle et al. |
| 5,914,687 | A | 6/1999 | Rose |
| 5,915,233 | A | 6/1999 | Nonaka |
| 6,031,600 | A | 2/2000 | Winner et al. |
| 6,128,576 | A | 10/2000 | Nishimoto et al. |
| 6,801,782 | B2 | 10/2004 | McCardy et al. |
| 6,831,591 | B2 | 12/2004 | Horibe |
| 7,132,981 | B1 | 11/2006 | Roberts |
| 7,292,631 | B2 | 11/2007 | Gregorius |
| 7,610,146 | B2 * | 10/2009 | Breed .......................... 701/514 |
| 7,710,246 | B2 | 5/2010 | Arakawa et al. |
| 7,844,144 | B2 * | 11/2010 | Kahn et al. ..................... 385/15 |
| 7,864,032 | B2 | 1/2011 | Kogure et al. |
| 8,050,863 | B2 | 11/2011 | Trepagnier et al. |
| 8,145,393 | B2 | 3/2012 | Foster et al. |
| 8,258,837 | B2 | 9/2012 | Mosalikanti et al. |
| 8,346,480 | B2 | 1/2013 | Trepagnier et al. |
| 8,411,258 | B2 | 4/2013 | Roberts et al. |
| 8,718,918 | B2 | 5/2014 | Roberts |
| 8,949,069 | B2 | 2/2015 | Roberts et al. |
| 2001/0053699 | A1 | 12/2001 | Mccrady et al. |
| 2002/0030611 | A1 | 3/2002 | Nuesser et al. |
| 2003/0098992 | A1 | 5/2003 | Park et al. |
| 2004/0234268 | A1 | 11/2004 | Olch |
| 2004/0247025 | A1 | 12/2004 | Gregorius |
| 2006/0056855 | A1 * | 3/2006 | Nakagawa et al. ........... 398/183 |
| 2006/0094350 | A1 | 5/2006 | Ishimura et al. |
| 2006/0132353 | A1 | 6/2006 | Natsume et al. |
| 2006/0285102 | A1 | 12/2006 | Aoki et al. |
| 2007/0102619 | A1 | 5/2007 | Kusaka |
| 2007/0296951 | A1 | 12/2007 | Kuijk et al. |
| 2008/0108372 | A1 | 5/2008 | Breed |
| 2008/0143584 | A1 | 6/2008 | Shoarinejad et al. |
| 2008/0243351 | A1 | 10/2008 | Isogai et al. |
| 2009/0072996 | A1 | 3/2009 | Schoepp |
| 2009/0134918 | A1 | 5/2009 | Tzeng |
| 2009/0169220 | A1 | 7/2009 | Kahn et al. |
| 2009/0237293 | A1 | 9/2009 | Sakuma |
| 2009/0243679 | A1 | 10/2009 | Smith et al. |
| 2009/0251976 | A1 | 10/2009 | Amarilio et al. |
| 2010/0067633 | A1 | 3/2010 | Den Besten |
| 2010/0156459 | A1 | 6/2010 | Plants et al. |
| 2010/0207820 | A1 | 8/2010 | Kawano et al. |
| 2010/0225370 | A1 | 9/2010 | Demone |
| 2010/0271617 | A1 | 10/2010 | Damink et al. |
| 2011/0018601 | A1 | 1/2011 | Yoshizawa et al. |
| 2011/0074477 | A1 | 3/2011 | Nagarajan et al. |
| 2011/0144941 | A1 | 6/2011 | Roberts et al. |
| 2011/0148486 | A1 | 6/2011 | Mosalikanti et al. |
| 2011/0169684 | A1 | 7/2011 | Margolin |
| 2011/0212699 | A1 * | 9/2011 | Howard et al. ............ 455/404.1 |
| 2011/0261347 | A1 | 10/2011 | Kassamakov et al. |
| 2011/0274432 | A1 | 11/2011 | Cunningham |
| 2012/0162633 | A1 | 6/2012 | Roberts et al. |
| 2013/0271747 | A1 | 10/2013 | Roberts |
| 2013/0293423 | A1 | 11/2013 | Mehran |
| 2013/0315604 | A1 * | 11/2013 | LoPresti et al. .............. 398/116 |
| 2014/0093234 | A1 * | 4/2014 | Roberts et al. ................. 398/25 |
| 2014/0180634 | A1 | 6/2014 | Manish |
| 2014/0347648 | A1 | 11/2014 | Roberts |

FOREIGN PATENT DOCUMENTS

| | | |
|---|---|---|
| WO | 2012/087944 | 6/2012 |
| WO | 2013/048502 | 4/2013 |
| WO | 2013/081595 | 6/2013 |
| WO | 2013/162559 | 10/2013 |

OTHER PUBLICATIONS

Bucher et al., "A Synthesizable VHDL Model of the Exact Solution for Three-dimensional Hyperbolic Positioning System", VLSI Design, 2002, vol. 15, Issue No. 2, 14 pages.

Klym et al., "The Evoltion of RFID Networks: The Potential for Disruptive Innovation", Cambridge University Communications Research Network, Mar. 2006, 20 pages.

International Preliminary Report on Patentability and Written Opinion for PCT Patent Application No. PCT/US2011/062578, mailed on Jun. 12, 2014, 7 pages.

International Search Report and Written Opinion for PCT Patent Application No. PCT/US2011/062578, mailed on Jul. 11, 2012, 10 pages.

International Preliminary Report on Patentability and Written Opinion for PCT Patent Application No. PCT/US2011/065866, mailed on Jul. 4, 2013, 6 pages.

International Search Report and Written Opinion for PCT Patent Application No. PCT/US2012/035117, mailed on Dec. 21, 2012, 9 pages.

International Search Report and Written Opinion for PCT Patent Application No. PCT/US2013/042782, mailed on Mar. 20, 2014, 12 pages.

International Search Report and Written Opinion for PCT Patent Application No. PCT/US2013/049825, mailed on Apr. 17, 2014, 13 pages.

Wen et al., "Distance Estimation Using Bidirectional Communications Without Synchronous Clocking", Feb. 4, 2006, 30 pages.

Roberts et al., "Visible Light Positioning: Automotive Use Case", 2010 IEEE Vehicular Networking Conference, 2010 IEEE, 6 pages.

Office Action for U.S. Appl. No. 12/639,236, mailed on Apr. 30, 2012, 11 pages.

Notice of Allowance for U.S. Appl. No. 12/639,236, mailed on Aug. 21, 2012, 10 pages.

Ex parte Quayle Office Action for U.S. Appl. No. 12/639,236, mailed on Jul. 11, 2014, 7 pages.

Office Action for U.S. Appl. No. 12/640,842, mailed on Dec. 16, 2011, 7 pages.

Notice of Allowance for the U.S. Appl. No. 12/640,842, mailed on Apr. 30, 2012, 6 pages.

Office Action for U.S. Appl. No. 12/975,451, mailed on Feb. 9, 2012, 16 pages.

Office Action for U.S. Appl. No. 12/975,451, mailed on Jul. 5, 2012, 16 pages.

Notice of Allowance for U.S. Appl. No. 12/975,451, mailed on Dec. 12, 2012, 5 pages.

Notice of Allowance for U.S. Appl. No. 13/977,671, mailed on Dec. 27, 2013, 13 pages.

Notice of Allowance for U.S. Appl. No. 12/639,236, mailed Sep. 30, 2015 15 pages.

International Preliminary Report on Patentability for PCT/US2013/042782, mailed on Dec. 10, 2015, 8 pages.

International Preliminary Report on Patentability for PCT/US2013/049825, mailed on Jan. 21, 2016, 9 pages.

Office Action for U.S. Appl. No. 13/976,989, with a mailing date of Mar. 11, 2016, 23 pages, accessed via the USPTO Public PAIR website on Jun. 6, 2016.

Office Action for U.S. Appl. No. 13/976,989, mailed on Jul. 15, 2016, 21 pages.

* cited by examiner

APPARATUS, SYSTEM AND METHOD OF COMMUNICATING POSITIONING TRANSMISSIONS

CROSS REFERENCE

This application is a National Phase Application of PCT International Application No. PCT/US2013/049825, International Filing Date Jul. 10, 2013, the entire disclosure of which is incorporated herein by reference.

TECHNICAL FIELD

Embodiments described herein generally relate to communicating positioning transmissions, and more particularly, to communicating vehicle-positioning transmissions.

BACKGROUND

Various object-detection systems and techniques exist. For example, Sound Navigation and Ranging (SONAR) is a technique that uses the propagation of sound waves to navigate or to communicate with or detect objects. SONAR may be used for acoustic location in both water and in the air, but has generally been supplanted by Radio Detection and Ranging (RADAR) for determining the range, speed, and so forth, of objects in the air. SONAR encompasses two primary types of ranging and detection schemes including passive SONAR, which involves listening for the sound made by vessels, and active SONAR, which involves emitting pulses of sounds and listening for echoes that are generated. While SONAR is a relatively inexpensive technology and is fairly accurate at short ranges, SONAR offers a relatively poor resolution compared to RADAR and other ranging technologies.

RADAR is an object detection system that makes use of radio waves to determine the range, altitude, speed, and so forth of objects. RADAR technology generally includes a transmitter that transmits pulses of radio waves or microwaves that bounce off of objects in their path. The objects return a portion of the wave's energy to a dish or antenna typically located in proximity to the transmitter. RADAR is not capable of directly determining position information between objects, e.g., an angular relationship between objects, which instead must be inferred from the range determination and an angle of the antenna. RADAR is a relatively expensive technology that provides better accuracy at longer ranges and better resolution than SONAR.

Light Detection and Ranging (LIDAR) is an optical remote sensing technology capable of measuring the distance to, or other properties of, a target, by illuminating the target with a pulse of light in the ultraviolet, visible, or near infrared spectrum from a Light Amplification by Stimulated Emission of Radiation (laser) source. LIDAR systems include both coherent and incoherent detection systems, each of which further encompasses two types of pulse models, namely, micropulse and high-energy systems. Micropulse systems use considerably less energy in the laser and are typically "eye-safe." High-energy systems are more commonly employed in conducting atmospheric research. LIDAR sensors mounted on mobile platforms require instrumentation to determine the absolute position and orientation of the sensor. Such instrumentation generally includes a Global Positioning System (GPS) receiver and an Inertial Measurement Unit (IMU). Similar to RADAR, LIDAR is only capable of determining a distance between objects; any determination of position information between objects must be inferred indirectly. While LIDAR generally offers better accuracy and higher resolution than other ranging technologies, such as SONAR and RADAR, LIDAR is also considerably more expensive to implement.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
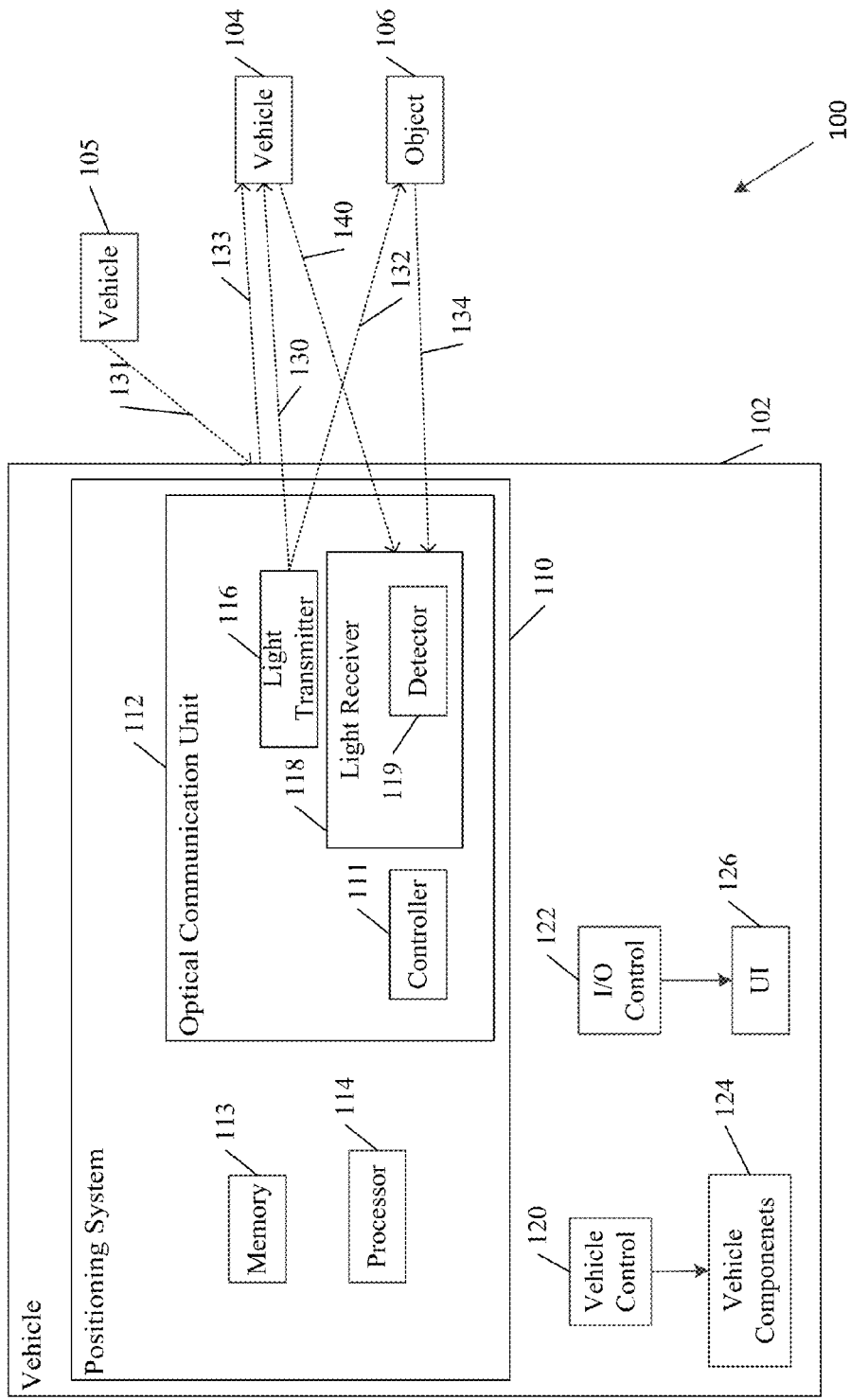
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

The term "communicating", as used herein with respect to a communication signal, includes transmitting the communication signal and/or receiving the communication signal. For example, a transceiver, which is capable of communicating a communication signal, may include a transmitter to transmit the communication signal to at least one communication device, and/or a receiver to receive the communication signal from at least one communication device. The signal may be communicated as part of a unidirectional communication or as part of a bidirectional communication.

The term "vehicle", as used herein, may refer to, but is not limited to, any that mobile object configured to transport passengers or cargo. The vehicle may include a land vehicle or a non-land vehicle or craft. In some non-limiting examples, vehicles may include, cars, motor-vehicles, road vehicles, motorcycles, mopeds, scooters, bicycles, two-wheeled vehicles, four-wheeled vehicles, all-terrain vehicles (ATVs), trucks, light-duty trucks, heavy-duty trucks, pickup trucks, minivans, crossover utility vehicles (CUVs), vans, commercial vehicles, private vehicles, sport utility vehicles (SUVs), tractor-trailers, airplanes, helicopters, other aircraft, spacecraft, satellites, or any other suitable mobile object provided with communicative and sensory capabilities.

Although some embodiments are described herein with respect to a vehicle, it should be appreciated that other embodiments may also be utilized in other transportation or non-transportation related applications where electronic communications between two systems may be implemented. For example, some embodiments may be implemented with respect to any non-vehicular mobile object. The phrase "mobile object", as used herein, may relate to any non-stationary object, device, system and/or machine.

The term "position", as used herein with reference to an entity, e.g., a vehicle or an object, may include a placement, a location, a rotation, and/or an orientation of the entity. For example, the position may be represented by a "position vector", which may include a vector in a two or three-dimensional space, e.g., <x, y, z>, or any other space, representation or coordinate system.

The term "distance", as used herein, may refer, for example, to a relative position, e.g., between an entity and a reference position or another entity. For example, the distance may be determined by the hypotenuse or magnitude of a position vector.

Reference is now made to FIG. 1, which schematically illustrates a block diagram of a system 100, in accordance with some demonstrative embodiments.

In some demonstrative embodiments, system 100 may include one or more vehicles, e.g., including vehicles 102 and/or 104.

In some demonstrative embodiments, at least one vehicle of system 100, e.g., vehicles 102 and/or 104, may include a positioning system 110, which may be utilized for determining the position of the vehicle, e.g., vehicle 102, for example, with respect to at least one other vehicle, e.g., vehicle 104, and/or at least one object, e.g., object 106, as described in detail below.

Some demonstrative embodiments are described herein with respect to a vehicle-positioning system, e.g., positioning system 110, which may be utilized for determining a position of a vehicle, e.g., vehicle 102. However, in other embodiments the positioning system may be configured for determining a position of any other non-vehicular object.

In some demonstrative embodiments, the positioning system of vehicles 102 and/or 104 may be configured to modulate a light source, e.g., with high frequency intensity modulation, to detect the transmitted light with spatial separation, to measure differential subcarrier phase shifts, and based on the detected phase to determine position information relating to the positioning of vehicles 102 and/or 104 and/or object 106, e.g., as described below.

In some demonstrative embodiments, positioning system 110 may include at least one optical communication 112 unit configured to communicate Intensity-Modulated (IM) optical signals, e.g., as described below.

In some demonstrative embodiments, optical communication unit 112 may include one or more light transmitters (also referred to as "light sources" or "optical transmitters") 116 to transmit the IM optical signals, e.g., as described below.

In some demonstrative embodiments, lights transmitters 116 may be configured to emit radiation at any suitable wavelength, intensity, and/or coherence. For example, light transmitters 116 may be configured to emit monochromatic or polychromatic radiation in the ultraviolet (UV), near-ultraviolet (near-UV), infrared (IR), or visible range.

In some demonstrative embodiments, light transmitter 116 may include a light-emitting diode (LED) configured to emit radiation in the UV, near-UV, IR, or visible wavelength range. In other embodiments, light transmitter 116 may include any other light source. For example, light transmitters 116 may include incandescent lamps, halogen lamps, fluorescent lamps, compact fluorescent lamps, gas discharge lamps, light amplification by stimulated emission of radiation (lasers), diode lasers, gas lasers, solid state lasers, and/or any other light source or any combinations thereof.

In some demonstrative embodiments, one or more light transmitters 116 may be implemented as part of one or more signaling lights of the vehicle 102. One or more light transmitters 116 may include LEDs, which may be implemented as part of one or more vehicle signaling lights of vehicle 102. For example, the one or more signaling lights may include, tail lights, brake lights, reverse lights, headlights, side lights, mirror lights, fog lamps, low beams, high beams, add-on lights, and/or any other signaling light or combinations thereof.

In some demonstrative embodiments, one or more light transmitters 116 may be positioned on the vehicle 102 independent of, and/or separate from, any signaling lights and may be configured to emit non-visible radiation such that a vehicle operator does not confuse the emitted radiation with other indications provided by the signaling lights.

In some demonstrative embodiments, optical communication unit 112 may include at least one light receiver 118 to receive the IM optical signals, e.g., as described below.

In some demonstrative embodiments, light receiver 118 may include at least one detector 119 to detect the IM optical signals. Detector 119 may include, for example, a photo-sensing device, a photodetecting device, photodiodes, optical detectors, LEDs that are reversed-biased to act as photodiodes, phototransistors, photoresistors, phototubes, photovoltaic cells, quantum dot photoconductors, charge-coupled devices (CCD), or active pixel sensors and/or any other signal sensors or detectors.

In some demonstrative embodiments, detector 119 may include a lensed detector array, which may include a lens and a linear detector array. For example, detector 119 may be operative to map an azimuth angle of arrival for detected light to pixel locations on an image plane of the linear detector array, e.g., as described below. According to this example, light detected at different pixels of the detector array may represent light received from different locations. Accordingly, detector 119 may be capable of spatially separating light received from spatially-separated light sources. In other embodiments, detector 119 may include any other elements and/or configuration.

In some demonstrative embodiments, optical communication unit 112 may include at least one light transmitter 116 and at least light receiver 118. In other embodiments, optical communication unit 112 may include only light transmitter 116 or light receiver 118.

In some demonstrative embodiments, optical communication unit 112 may be configured to perform a first positioning communication ("one way positioning"), in which optical communication unit 112 may communicate the IM optical signals in one direction, e.g., as described below with reference to FIGS. 2A, 2B, 3A and/or 3B.

In one example, optical communication unit 112 may perform one-way positioning (ranging) communication by transmitting IM optical signals to another vehicle. For example, optical communication unit 112 may perform one-way ranging communication by transmitting IM optical signals 130 from light transmitter 116 to vehicle 104. Signals 130 may be used by vehicle 104, for example, to determine a positioning of vehicle 104, e.g., relative to vehicle 102.

In another example, optical communication unit 112 may perform one-way positioning communication by receiving IM optical signals from another vehicle. For example, optical communication unit 112 may perform one-way positioning communication by receiving at light receiver 118 IM optical signals 140 from vehicle 104. Signals 140 may be used by vehicle 102, for example, to determine a positioning of vehicle 102, e.g., relative to vehicle 104.

In some demonstrative embodiments, optical communication unit 112 may be configured to perform a second positioning (ranging) communication ("two way positioning"), in which optical communication unit 112 may communicate the IM optical signals in two directions. For example, optical communication unit 112 may transmit and receive IM optical signals, e.g., as described below with reference to FIGS. 4A and 4B.

In one example, optical communication unit 112 may perform two-way ranging communication by transmitting IM optical signals towards another element of system 100, e.g., object 106 or another vehicle. For example, optical communication unit 112 may perform two-way positioning communication by transmitting IM optical signals 132 from light transmitter 116 towards object 106, and receiving at light receiver 118 signals 134 reflected by object 106. Signals 134 may be used by vehicle 102, for example, to determine a positioning of vehicle 102, e.g., relative to object 106.

Some demonstrative embodiments are described herein with respect to vehicle-positioning communications by one or more vehicles. However, other embodiments may include positioning communications, which may be communicated by one or more non-vehicular devices, e.g., one or more mobile objects.

In some demonstrative embodiments, the IM optical signals may include On-Off-Keying (OOK) signals, e.g., as described below.

The phrase "on-off-keying", as used herein, may include an amplitude-shift-keying (ASK) scheme, which may represent data, e.g., digital data, as the presence or absence of a carrier wave. The OOK signals may also be referred to as "un-modulated signals". For example, the presence of a carrier, e.g., for a predefined duration, may represent a first value, e.g., the binary value "1", while the absence of the carrier for the same duration may represent a second value, e.g., the binary value "0".

Although some demonstrative embodiments are described herein with respect to communicating ranging information in the form of OOK signals, in other embodiments the ranging information may be communicated using any other ASK scheme or any other keying or coding scheme.

In some demonstrative embodiments, optical communication unit 112 may also include a controller 111 to control light transmitters 116 and/or light receivers 118, e.g., as described below.

In some demonstrative embodiments, positioning system 110 may also include a processor 114 to process communications performed by optical communication unit 112, for example, to determine positioning information corresponding to vehicle 102, e.g., as described below.

In some demonstrative embodiments, controller 111 may be implemented as part of optical communication unit 112. In other embodiments, controller 111 may be implemented as part of processor 114 or as part of any other element of positioning system 110.

In some demonstrative embodiments, processor 114 and optical communication unit 112 may be implemented as separate elements of positioning system 110. In other embodiments, processor 114 and optical communication unit 112 may be implemented as part of a common element of positioning system 110.

In some demonstrative embodiments, processor 114 may interact with and/or control one or more vehicle control units 120, which may control one or more vehicle components 124 of vehicle 102.

In some demonstrative embodiments, vehicle components 124 may include, for example, one or more components controlling the velocity and/or acceleration of the vehicle, e.g., motor components, brake components, parking components, transmission components, fuel supply components, clutch components, and the like, one or more steering components controlling a direction of the vehicle, e.g., wheel steering components, one or more signaling components, e.g., signaling lights, warning lights, brake lights, and the like, and/or any other element or component of the vehicle.

In some demonstrative embodiments, processor 114 may interact with or control one or more vehicle input/output control units 122, which may control one or more User Interface (UI) components 126 of vehicle 102.

In some demonstrative embodiments, UI components 126 may include, for example, an input device, an output device, or input and output device that can be used by a user to communicate with processor 114. For example, UI components 126 may include a touch panel, a touch-screen, a touch-pad, a keyboard, a keypad, a microphone, a display, a speaker, a switch, a visual indicator, an audio indicator, a tactile indicator, a speech to text engine, and the like.

In some demonstrative embodiments, UI components 126 may be used by a user, such as a driver of the vehicle 102, to selectively activate or deactivate positioning system 110, to control processor 114 to provide one or more control signals to the one or more vehicle control units 120, and/or to control the one or more vehicle components 124.

In some demonstrative embodiments, processor 114 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller.

In some demonstrative embodiments, processor 114 may be part of a general vehicle main computer system of vehicle 102. The main computer system may, for example, manage various aspects of the operation of the vehicle, such as engine control, transmission control, and various component controls.

In some demonstrative embodiments, positioning system 110 may also include a memory 113 to store information processed by processor 114. Memory 113 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit and/or other suitable memory units.

In some demonstrative embodiments, the determined position of vehicle 102 may be utilized to facilitate cooperative driving, collision avoidance, and/or collision warning functionalities.

In one example, processor 114 may output the determined position to the one or more vehicle control units 120, which may, in turn, control the one or more vehicle components 124 to alter a velocity or an acceleration of the vehicle 102 to initiate collision avoidance or collision safety measures, or to provide a warning indication to a user of the vehicle 102 and/or to a user of the vehicle 104.

In another example, processor 114 may output the determined position to the one or more input/output control units 122, which, in turn, may control user interface 126 to provide a user, e.g., driver, of the vehicle 102 with an indication of the determined position and one or more potential warning indications. The user interface 126 may also provide the user of the vehicle 102 with functionality that allows the user to control the one or more vehicle components 124 via the one or more vehicle control units 120 based on the determined position.

In some demonstrative embodiments vehicles 102 and/or 104 may be configured to communicate according to a communication protocol, e.g., as described in detail below.

In some demonstrative embodiments, the communication protocol may be configured to enable a positioning system, e.g., positioning system 110, of a vehicle, e.g., vehicle 102, to dynamically switch between one-way ranging and two-way ranging, and/or to communicate ranging signals with positioning systems of one or more other vehicles, e.g., vehicle 104.

In some demonstrative embodiments, the communication protocol may be configured to reduce and/or avoid, at least partially, effects of interference, e.g., reflective interference or other interference, between communications performed by a light source of the positioning system and signals communicated by one or more other light sources, e.g., other light sources of the same positioning system and/or light sources of other positioning systems.

In some demonstrative embodiments, ranging communications performed by an optical communication unit of a vehicle, e.g., optical communication unit 112 of vehicle 102, may be affected by interference and/or reflections of other ranging communications, e.g., other ranging communications performed by the optical communication unit and/or other ranging communications performed by other optical communication units of other vehicles.

In some demonstrative embodiments, the interference may be caused by one-way ranging signals communicated between a plurality of vehicles.

In one example, the plurality of vehicles may be involved in a one-way cooperative ranging process. For example, light transmitter 116 may transmit signals 130 to vehicle 104, while another vehicle 105 may transmit signals 131 towards vehicle 102. According to this example, at least part of the signals 131 transmitted by the vehicle 105 may be reflected off vehicle 102 towards vehicle 104 in the form of reflected signals 133. As a result, the signals 133 reflected off vehicle 102 may cause interference to signals 130, when received at vehicle 104, e.g., if both signals 131 and 130 are transmitted over the same frequency band.

In some demonstrative embodiments, the interference may be caused by two-way ranging signals communicated by different light sources of a vehicle.

In one example, vehicle 102 may utilize a plurality of light transmitters 116 to illuminate object 106 with a plurality of signals 132, for example, such that light receiver 118 may process a plurality of reflections 134, e.g., as described above. Interference may occur at light receiver 118 between the reflections 134 of the plurality of signals 132, for example, if the plurality of signals 132 are transmitted over the same frequency.

In some demonstrative embodiments, controller 111 may control light transmitters 116 to transmit IM optical signals over different ranging frequencies, e.g., as described below.

In some demonstrative embodiments, controller 111 may control light transmitters 116 to transmit light signals over different ranging frequencies, for example, according to a Spatial-Division-Multiple-Access (SDMA) scheme, e.g., as described below.

In some demonstrative embodiments, transmitting the light signals according to the SDMA scheme may enable, for example, a receiver of the light signals, e.g., light receiver 118 of vehicle 102 or a light receiver of vehicle 104, to differentiate between light signals transmitted by different light sources based on both the spatial separation of the light sources, e.g., as detected by detector 119, as well as on the frequency separation of the light signals, which may be detected, for example, during processing the light signals in a frequency domain, e.g., as described below.

In some demonstrative embodiments, controller 111 may control at least one light transmitter 116 to transmit from vehicle 102 IM optical signals, e.g., signals 130 and/or 132, including OOK signals of one or more vehicle-positioning transmissions, for example, one-way and/or two-way vehicle-positioning transmissions, e.g., as described above.

In some demonstrative embodiments, controller 111 may control the at least one light transmitter 116 to transmit from vehicle 102 one or more first OOK signals over a first ranging frequency, and to transmit from vehicle 102 one or more second OOK signals over a second ranging frequency, e.g., which is different from the first ranging frequency, as described below.

In some demonstrative embodiments, transmitting the IM optical signals over different ranging frequencies may reduce the probability that a light receiver of the IM optical signals, e.g., light receiver 118 of vehicle 102 or a light receiver of vehicle 104, will simultaneously receive two or more IM optical signals over the same frequency.

Accordingly, transmitting the IM optical signals over different ranging frequencies may reduce the susceptibility of the IM optical signals transmitted by a light transmitter 116 to interference and/or reflections of other ranging transmissions, e.g., other ranging transmissions performed by one or more other light transmitters 106 of vehicle 102 and/or other ranging transmissions performed by other light transmitters of other vehicles, e.g., vehicle 105.

In some demonstrative embodiments, the probability ("the probability of interference") that the light receiver will simultaneously receive two or more IM optical signals over the same ranging frequency may be related to the probability that the same ranging frequency may be selected for two or more ranging transmissions simultaneously or within a relatively short time period. In one example, increasing a ranging frequency bandwidth and/or a number of ranging frequencies, which may be used for transmitting the IM optical signals, may reduce the probability of interference.

In some demonstrative embodiments, controller 111 may select the ranging frequency to be used by the at least one light transmitter 116 for communicating the ranging signals according to an IM frequency hopping (FH) SDMA (FH-SDMA) protocol, e.g., as described below.

In some demonstrative embodiments, controller 111 may select the ranging frequency according to a predefined frequency hopping size. For example, controller 111 may use the predefined hopping size to select the first and second ranging frequencies for transmitting the first and second OOK signals, e.g., as described below.

In some demonstrative embodiments, controller 111 may select the first ranging frequency to be offset from a center frequency by a first integer multiple of the frequency hopping size, and the second ranging frequency to be offset from the center frequency by a second integer multiple of the frequency hopping size, e.g., as described below.

In some demonstrative embodiments, controller 111 may randomly select the first and second ranging frequencies. For example, controller 111 may randomly select the first and second integer multiples to be used for setting the first and second ranging frequencies, e.g., as described below.

In other embodiments, controller 111 may select the ranging frequency to be used for communicating the ranging signals according to any other protocol, selection scheme and/or criteria.

In some demonstrative embodiments, controller 111 may select the first ranging frequency for transmitting first OOK signals of a first vehicle-positioning transmission, and the second ranging frequency for transmitting second OOK signals of a second vehicle-positioning transmission, e.g., subsequent to the first vehicle positioning transmission.

In one example, the first and second vehicle-positioning transmissions may include first and second one-way positioning transmissions transmitted from a vehicle, e.g., vehicle 102. For example, each of the first and second one-way positioning transmissions may include IM optical signals transmitted by one or more light transmitters of the vehicle, e.g., simultaneously, as described below with reference to FIGS. 2A and 2B and/or 3A and 3B.

In some demonstrative embodiments, controller 111 may control a plurality of light transmitters 116 to simultaneously transmit the first OOK signals of a first one-way vehicle-positioning transmission over the first ranging frequency, and to simultaneously transmit the second OOK signals of the second one-way vehicle-positioning transmission over the second ranging frequency.

In some demonstrative embodiments, controller 111 may select different ranging frequencies for transmitting signals of a two-way positioning transmission by a plurality of light transmitters, e.g., as described below with reference to FIGS. 4A and 4B.

In some demonstrative embodiments, controller 111 may control at least first and second light transmitters 116 to transmit the two-way positioning transmission. For example, controller 111 may control the first light transmitter 116 to transmit a first OOK signal over the first ranging frequency and the second light transmitter 116 to transmit a second OOK signal over the second ranging frequency.

In some demonstrative embodiments, controller 111 may control the first and second light transmitters 116 to transmit the first and second OOK signals simultaneously.

In some demonstrative embodiments, controller 111 may control the first and second light transmitters 116 to transmit the first and second OOK signals sequentially.

In some demonstrative embodiments, optical communication unit 112 may be configured to perform frequency hopping, for example, per different light signals of a common vehicle-positioning transmission, e.g., between light signals of a two-way positioning transmission, per vehicle-positioning transmission, e.g., between one-way positioning transmissions, or for every other number of vehicle-positioning transmissions and/or optical signals.

In some demonstrative embodiments, controller 111 may control light transmitter 116 to transmit ranging signals, e.g., signals 130 and/or 132, at a frequency having a frequency offset with respect to a center frequency of a predefined ranging frequency band.

In some demonstrative embodiments, the predefined ranging frequency band may include a first predefined ranging frequency band, e.g., for one-way vehicle-positioning transmissions, or a second predefined ranging frequency band, e.g., for two-way vehicle-positioning transmissions.

In one example, the ranging frequency band may include a frequency band above 40 Mega-Hertz (MHz), e.g., for one-way vehicle-positioning transmissions, or a frequency band below 20 MHz, e.g., for two-way vehicle-positioning transmissions.

In other embodiments, any other ranging frequencies may be used. In one example, the ranging frequency band may include any other frequency band for one-way vehicle-positioning transmissions and/or any other frequency band for two-way vehicle-positioning transmissions. In another example, the ranging frequency band may include a common frequency band for both one-way vehicle-positioning transmissions as well as two-way vehicle-positioning transmissions.

Some demonstrative embodiments are described herein with respect to communicating the one-way positioning signals and the two-way positioning signals over two separate frequency bands. However, in other embodiments, the one-way positioning signals and the two-way positioning signals may be communicated over the same frequency band or over two partially overlapping bands.

In some demonstrative embodiments, a frequency ("operating frequency"), denoted $F_{op}$, for communicating ranging signals of a vehicle-positioning transmission, e.g., signals 130 and/or 132, may be determined, e.g., by controller 111, based on a predefined frequency hop size, denoted ΔF, e.g., as follows:

$$F_{op}=F_c+\alpha \cdot \Delta_F \quad (1)$$

wherein $F_c$ denotes the band center frequency of the ranging frequency band, wherein α denotes an integer selected from an integer set ⟨−k . . . k⟩, and wherein k denotes an integer relating to the number of hopping frequencies. For example, the value of α may be selected from the set ⟨−k . . . k⟩, e.g., randomly.

In some demonstrative embodiments, the frequency hopping may be implemented to avoid, for example, long-term effects of reflected interference. For example, positioning calculations relating to the positioning of a vehicle, e.g., vehicle 102, may be based on a weighted average of a plurality of measurements, e.g., using a plurality of vehicle-positioning transmissions. The frequency hopping may, for example, circumvent negative effects of a transmission being corrupted by interference. For example, Kalman filtering and/or other techniques and/or discarding of outlier readings, may enable mitigating the effect of the interference.

In some demonstrative embodiments, slow frequency hopping for one-way ranging may be performed, for example, by controlling, e.g., by controller 111, all the light sources, e.g., light sources 116, to transmit on the same hopped frequency within the ranging frequency.

In some demonstrative embodiments, slow frequency hopping for two-way ranging may be performed, for example, by controlling, e.g., by controller 111, each light source, e.g., each of light sources 116, to transmit on a unique frequency within the ranging frequency.

In one example, controller 111 may control each light source 116 to operate at a fixed frequency offset from a fixed system center frequency, which may be selected, for example, according to Equation 1.

In another example, controller 111 may control each light source 116 to operate at a unique frequency randomly selected from a set of frequencies, e.g., according to Equation 1.

In some demonstrative embodiments, optical communication unit 112 may be configured to transmit to an intended receiver of the vehicle-positioning transmission, e.g., vehicle 104, an indication of the ranging frequency to be used for transmitting the OOK signals of the vehicle-positioning transmission. Transmitting the indication of the ranging frequency may enable, for example, the intended receiver to detect the OOK signals of the vehicle-positioning transmission.

In one example, controller 111 may control light transmitter 116 to transmit signals including the indication of the ranging frequency, e.g., prior to transmitting the OOK signals over the ranging frequency.

In other embodiments, optical communication unit 112 may not be required to transmit the indication of the ranging frequency. For example, light receiver 118 may be capable of detecting the ranging frequency based on an analysis, e.g., a Fast-Fourier-Transform (FFT) analysis, of the received ranging signals, e.g., as described below with reference to FIG. 5.

Figure 2A:
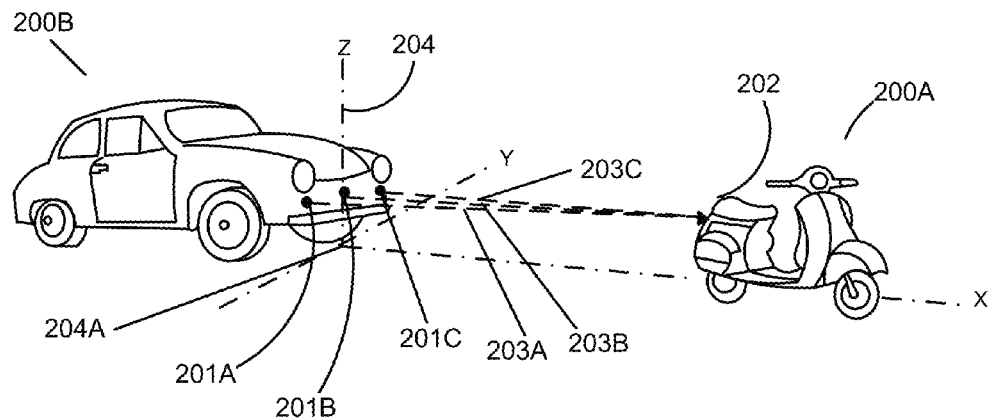
FIG. 2A is a schematic representation of an interaction between vehicles employing a one-way positioning system, in accordance with some demonstrative embodiments.

Reference is made to FIG. 2A, which schematically illustrates an interaction between vehicles employing a one-way positioning system, in accordance with some demonstrative embodiments.

As shown in FIG. 2A, a first vehicle 200A may perform one-way positioning communication with a second vehicle 200B. For example, vehicle 200A may perform the functionality of vehicle 102 (FIG. 1) and/or vehicle 200B may perform the functionality of vehicle 104 (FIG. 1).

In some demonstrative embodiments, vehicle 200A may include a signal sensor 202, and vehicle 200B may include one or more signal transmitters ("sources"), e.g., including three signal sources 201A, 210B and 210C. For example, signal sensor 202 may perform the functionality of light receiver 118 (FIG. 1) and/or signal sources 201A, 201B and/or 201C may perform the functionality of light source 116 (FIG. 1).

As shown in FIG. 2A, signal sources 201A, 201B and 201C may be configured to emit signals that may travel along propagation paths 203A, 203B and 203C, respectively.

In some demonstrative embodiments, vehicle 200A may include one signal sensor 202 and vehicle 200B may include three signal sources 201A, 201B and 201C, e.g., as shown in FIG. 2A. However, in other embodiments, any other configurations may be implemented. For example, the vehicle 200B may include any number of signal sources and/or the vehicle 200A may include any number of signal sensors. In one example, vehicle 200B may include one or more additional groups of three signal sources, and/or vehicle 200A may include additional signal sensor(s), e.g., such that each group of three signal sources transmits signals to each signal sensor. Such configuration may enable, for example, determining multiple positions of a vehicle in relation to another vehicle, which may be used, for example, to determine angular deviations or displacements between vehicles.

Although the signal sources 201A, 201B and 201C are shown in FIG. 2A as being positioned at a front of the vehicle 200B, any other configuration of signal sources 201A, 201B and 201C may be used. For example, one or more additional signal sources may be positioned at the front, sides, roof, and/or rear of the vehicle 200B. Similarly, additional signal sensors may be positioned at the front, roof, sides, and/or rear of the vehicle 200A.

As shown in FIG. 2A, a coordinate system 204 may be defined in relation to the second vehicle 200B. The coordinate system 204 may have a center coordinate 204A located in proximity to the signal sources 201A, 201B and 201C, such as, for example, vertically beneath the signal source 201B. However, in other embodiments, the coordinate system 204 may be centered at any other spatial position.

In some demonstrative embodiments, the signal sensor 202 associated with vehicle 200A may be configured to detect the signals received from the signal sources 201A, 201B and 201C.

In some demonstrative embodiments, vehicle 200B may include a controller, e.g., controller 111 (FIG. 1), which may electrically control light sources 201A, 201B and 201C to synchronously emit pulsed signals, e.g., by turning light sources 201A, 201B and 201C on and off synchronously.

Figure 2B:
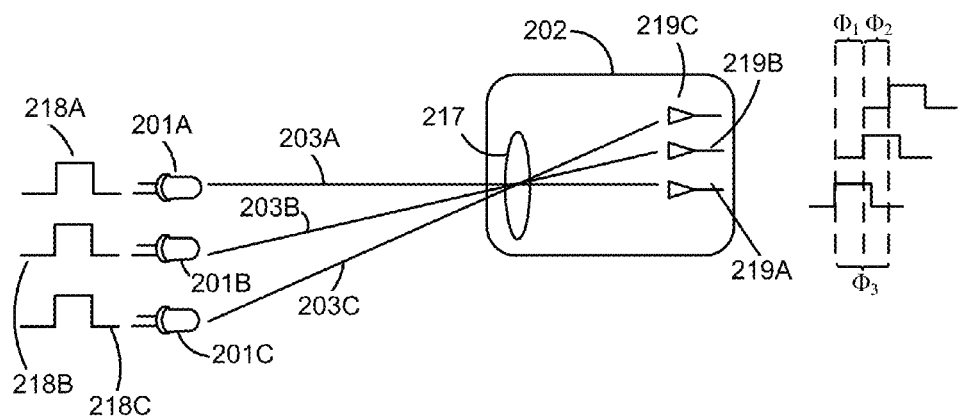
FIG. 2B is a schematic illustration of the transmission and receipt of signals by the vehicles of FIG. 2A, in accordance with some demonstrative embodiments.

FIG. 2B is a schematic illustration of the transmission and receipt of signals vehicles 200A and 200B, in accordance with some demonstrative embodiments.

In some demonstrative embodiments, controller 111 (FIG. 1) may control light sources 201A, 201B and 201C to transmit signals 218A, 218B and 218C, respectively, which may travel along propagation paths 203A, 203B and 203C, respectively.

In some demonstrative embodiments, the signals 218A, 218B and 218C may be modulated using any appropriate analog or digital modulation technique including, but not limited to, amplitude modulation (AM) such as, for example, amplitude-shift keying (ASK) modulation. In other embodiments, the signals 218A, 218B and 218C may be modulated using phase modulation such as, for example, one or more forms of phase-shift keying (PSK); frequency modulation such as, for example, one or more forms of frequency-shift keying (FSK); quadrature amplitude modulation (QAM); or any other modulation technique.

In some demonstrative embodiments, one or more sub-carrier signals may be added to each of the signals 218A, 218B and/or 218C, and the sub-carrier signal(s) may be phase modulated or frequency modulated.

In some demonstrative embodiments, the sub-carrier signals may be modulated with orthogonal frequency-division multiplexing (OFDM). In one example, controller 111 (FIG. 1) may control signal sources 201A, 201B and 201C to operate in a pulsed manner, e.g., to generate high frequency ON and OFF keyed waveforms.

In some demonstrative embodiments, signals 218A, 218B and 218C may be modulated at a frequency that is high enough to permit a positioning technique to be used to analyze the signals, but not so high as to cause phase aliasing. For example, phase aliasing may occur, e.g., if a time of flight of the signals 218A, 218B and/or 218C exceeds half of the period of the signals.

In some demonstrative embodiments, the signals 218A, 218B and 218C emitted by the signal sources 201A, 201B and 201C may reach the signal sensor 202 at different times, e.g., since the propagation paths along which the signals 218A, 218B and 218C travel may vary in length.

In some demonstrative embodiments, signal sensor 202 include a non-imaging sensor array including an optical lens 217 and an array of pixel sensors 219A, 219B and 219C. As shown in FIG. 2B, signals 218A, 218B and 118C may converge on one side of the lens 217 and may be spatially separated on an opposing side of the lens 217. As also shown in FIG. 2B, each pixel sensor 219A, 219B and 219B may detect a respective corresponding signal of the signals 218A, 218B and 218C.

In some demonstrative embodiments, phase shifts ("phase differences") may be measured between the signals 218A, 218B and 218C as received by signal sensor 202, e.g., at pixel sensors 219A, 219B and 219C.

For example, as shown in FIG. 2B, a phase shift, denoted φ1, may be measured between the signal 218A and the signal 218B, a phase shift, denoted φ2, may be measured between the signal 218B and the signal 218C, and/or a phase shift, denoted φ3, may be measured between the signal 218A and the signal 218C.

In other embodiments, signal sensor 202 may include any other signal sensor, e.g., an imaging sensor array having a suitable pixel density, or a scanning array that has a sufficiently high frame rate capable of sampling the frequencies of the signals 218A, 218B and 218C, e.g., such that the phase shifts between the signals may be determined at receipt by the signal sensor 202.

In some demonstrative embodiments, the phase shift, denoted φ, in radians, between two signals may be related to a time delay difference, denoted τ, in receipt of the signals at signal sensor 202, e.g., resulting from the different propagation paths taken by the signal. For example, the phase shift φ may be related to the time difference τ, e.g., as follows:

$$\phi = 2*\pi*f*\tau \qquad (2)$$

wherein f denotes a frequency of the IM signals.

In some demonstrative embodiments, a processor, e.g., processor 114 (FIG. 1) may be configured to determine time delays between the pairs of signals 281A, 218B and 218C based on measured phase shifts φ1, φ2, φ3 between the pairs of signals 218A, 218B and 218C. For example, processor 114 (FIG. 1) may determine a set of time values, e.g., including time delay values τ1, τ2, and τ3, representing a difference in a time of receipt or detection at the signal sensor 202 of the signals 218A and 218B, the signals 218B and 218C, and the signals 218A and 218C, respectively.

In some demonstrative embodiments, processor 114 (FIG. 1) may be configured to generate a set of distance expressions. For example, each distance expression may represent a distance between one of the signal sources 201A, 201B and 201C and the signal sensor 202. Processor 114 (FIG. 1) may be configured to determine a set of distance equations based on the set of distance expressions and the set of time values.

In some demonstrative embodiments, processor 114 (FIG. 1) may be configured to solve the set of distance equations to determine a position of the first vehicle 200A (e.g., a position of the signal sensor 202) within the coordinate system 204 defined in relation to the second vehicle 200B, or more specifically, in relation to the signal sources 201A, 201B and 201C.

In some demonstrative embodiments, the determined position may be utilized to facilitate cooperative driving, collision avoidance, and/or collision warning functionalities. In one example, processor 114 (FIG. 1) may output the determined position to the one or more vehicle control units 120 (FIG. 1), which may, in turn, control the one or more vehicle components 124 (FIG. 1) to alter a velocity or an acceleration of the vehicle 200A (FIG. 2A) to initiate collision avoidance or collision safety measures, and/or to provide a warning indication to a user of the vehicle 200A (FIG. 2A) or to a user of the vehicle 200B (FIG. 2A). In another example, processor 114 (FIG. 1) may output the determined position to the one or more input/output control units 122 (FIG. 1), which, in turn, may control a user interface 126 (FIG. 1) to provide a user (e.g., driver) of the vehicle 200A (FIG. 2A) with an indication of the determined position and one or more potential warning indications. The user interface 126 (FIG. 1) may also provide the user of the vehicle 200A (FIG. 2A) with functionality that allows the user to control the one or more vehicle components 124 (FIG. 1) via the one or more vehicle control units 120 (FIG. 1) based on the determined position.

In some demonstrative embodiments, controller 111 (FIG. 1) may control signal sources 201A, 201B and 201C to communicate a plurality of one-way positioning transmissions over a plurality of different ranging frequencies.

For example, controller 111 (FIG. 1) may control signal sources 201A, 201B and 201C to transmit a first one-way positioning transmission and a second one-way positioning transmission, e.g., subsequent to the first one-way positioning transmission.

In some demonstrative embodiments, controller 101 (FIG. 1) may control signal sources 201A, 201B and 201C to transmit OOK signals, e.g., a first set of signals 218A, 218B and 218C, of the first one-way positioning transmission over a first ranging frequency, and to transmit OOK signals, e.g., a second set of signals 218A, 218B and 218C, of the second one-way positioning transmission over a second ranging frequency, e.g., different from the first ranging frequency.

In some demonstrative embodiments, the first and second one-way positioning transmissions may be directed to the same vehicle, e.g., the first and second one-way positioning transmissions may be directed to vehicle 200A.

In some demonstrative embodiments, the first and second one-way positioning transmissions may be directed to different vehicles, e.g., the first one-way positioning transmission may be directed to a first vehicle, e.g., vehicle 200A, and the second one-way positioning transmission may be directed to a second vehicle (not shown in FIG. 2A), e.g., other than vehicle 200A.

In some demonstrative embodiments, controller 111 (FIG. 1) may control signal sources 201A, 201B and 201C to simultaneously transmit the first set of signals 218A, 218B and 218C of the first one-way positioning transmission and/or to simultaneously transmit the second set of signals 218A, 218B and 218C of the second one-way positioning transmission. In other embodiments, the signals 218A, 218B and 218C of each of the first and second one-way positioning transmissions may be transmitted in a consecutive manner.

Figure 3A:
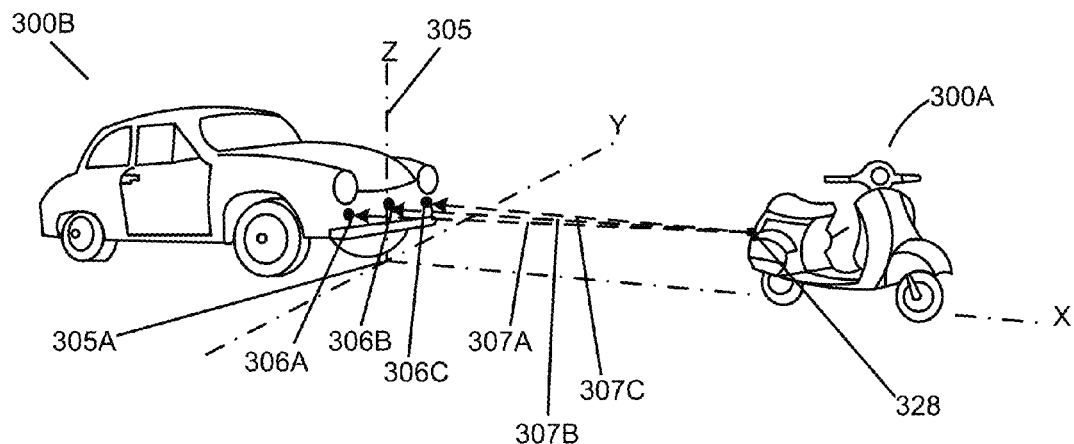
FIG. 3A is a schematic representation of an interaction between vehicles employing a one-way positioning system, in accordance with some demonstrative embodiments.
Figure 3B:
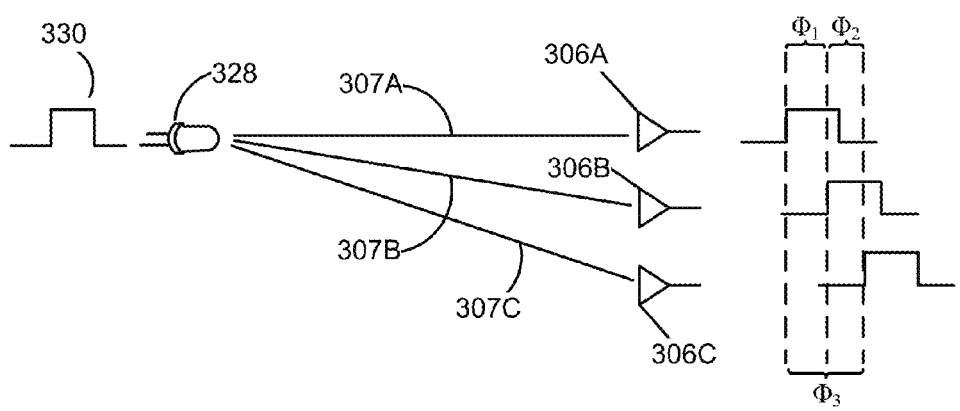
FIG. 3B is a schematic illustration of the transmission and receipt of signals by the vehicles of FIG. 3A, in accordance with some demonstrative embodiments.

FIG. 3A is a schematic representation of an interaction between vehicles 300A and 300B employing a one-way positioning system, in accordance with some demonstrative embodiments. FIG. 3B is a schematic illustration of the transmission and receipt of signals by the vehicles 300A and 300B, in accordance with some demonstrative embodiments. For example, vehicle 300A may perform the functionality of vehicle 104 (FIG. 1) and/or vehicle 300B may perform the functionality of vehicle 102 (FIG. 1).

In some demonstrative embodiments, vehicle 300A may have a signal source 328 configured to emit a signal 330, and vehicle 300B may have three signal sensors 306A, 306B and 306C to receive the signal 330 via three paths 307A, 307B and 307C. For example, signal source 328 may perform the functionality of light source 116 (FIG. 1) and/or signal sensors 306A, 306B and 306C may perform the functionality of slight receiver 118 (FIG. 1).

In some demonstrative embodiments, a coordinate system 305 may be defined in relation to the first vehicle 300B. The coordinate system 305 may have a center coordinate 305A located in proximity to the signal sensors 306A, 306B and 306C, such as, for example, vertically beneath the signal sensor 306B. The coordinate system 305 may be centered at any spatial position within relative proximity of the signal sensors 306A, 306B and 306C.

In some demonstrative embodiments, the signal 330 emitted by the signal source 328 may travel along propagation paths 307A, 307B and 307C, and may reach the signal sensors 306A, 306B and 306C at different times. Phase shifts between the signal 330 received by each of the signal sensors 306A, 306B and 306C may be determined, e.g., as described above. A processor, e.g., processor 114 (FIG. 1) may determine a set of time values based on the measured phase shifts, e.g., as described above.

In some demonstrative embodiments, vehicle 300A may include a controller, e.g., controller 111 (FIG. 1), to control signal source 328 to communicate a plurality of one-way positioning transmissions over a plurality of different ranging frequencies.

For example, controller 111 (FIG. 1) may control signal source 328 to transmit a first one-way positioning transmission and a second one-way positioning transmission, e.g., subsequent to the first one-way positioning transmission.

In some demonstrative embodiments, controller 101 (FIG. 1) may control signal source 328 to transmit an OOK signal, e.g., a first signal 330, of the first one-way positioning transmission over a first ranging frequency, and to transmit an OOK signal, e.g., a second signal 330, of the second one-way positioning transmission over a second ranging frequency, e.g., different from the first ranging frequency.

In some demonstrative embodiments, the first and second one-way positioning transmissions may be directed to the same vehicle, e.g., the first and second one-way positioning transmissions may be directed to vehicle 300B.

In some demonstrative embodiments, the first and second one-way positioning transmissions may be directed to different vehicles, e.g., the first one-way positioning transmission may be directed to a first vehicle, e.g., vehicle 300B, and the second one-way positioning transmission may be directed to a second vehicle (not shown in FIG. 3A), e.g., other than vehicle 300B.

Figure 4A:
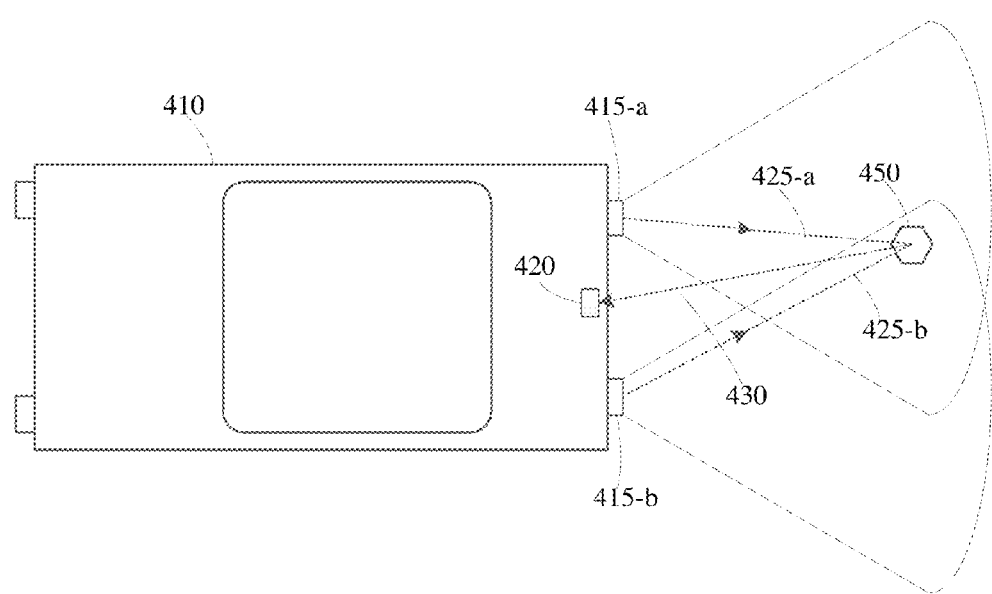
FIG. 4A is a schematic representation of a vehicle employing a two-way positioning system, in accordance with some demonstrative embodiments.

FIG. 4A is a schematic representation of a vehicle 410 employing a two-way positioning system, in accordance with some demonstrative embodiments. For example, vehicle 410 may perform the functionality of vehicle 102 (FIG. 1).

In some demonstrative embodiments, vehicle 410 may include a first light source 415-a, which may be, for example, integrated into a first taillight of the vehicle 410, and a second light source 415-b, which may be, for example, integrated into a second taillight of the vehicle 410. Vehicle 410 may also include a light receiver 420, which may be, for example, mounted in a fixed and known location, e.g., near the rear of the vehicle 410. In one example, light sources 415-a and/or 415-b may perform the functionality of light sources 116 (FIG. 1), and/or light receiver 420 may perform the functionality of light receiver 118 (FIG. 1).

In some demonstrative embodiments, an object 450 may be located behind the vehicle 415. The first light source 415-a may emit modulated light 425-a, which may bounce off the object 450 and may be reflected 430 back to the light receiver 420 where it may be received and processed. Similarly, the second light source 415-a may emit modulated light 425-b, which may bounce off the object 450 and may be reflected 430 back to the light receiver 420 where it may be received and processed.

Figure 4B:
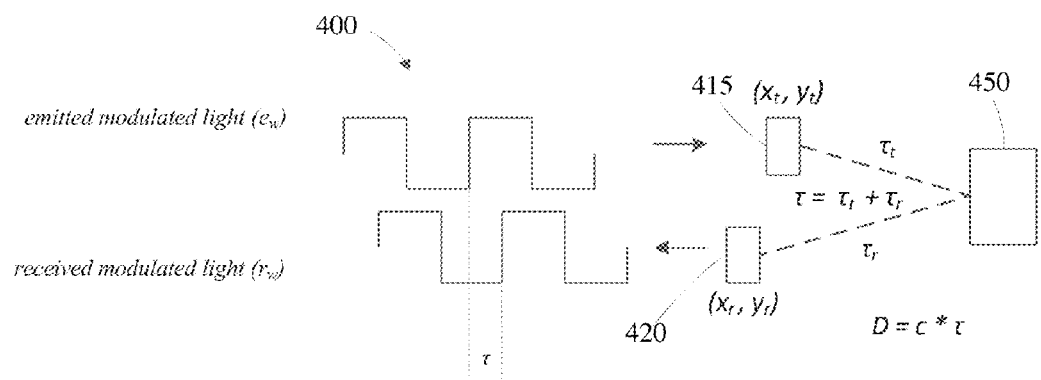
FIG. 4B is a schematic illustration of the transmission and receipt of signals by the vehicle of FIG. 4A, in accordance with some demonstrative embodiments.

FIG. 4B is a schematic illustration of the transmission and receipt of signals by the vehicle 410, in accordance with some demonstrative embodiments.

As shown in FIG. 4B, a waveform 400 may represent an OOK ranging tone being reflected off object 450. The waveform 400 may be high when on and low when off. The first light source 415-a located at a known and fixed position, denoted $(x_t, y_t)$, may emit the modulated waveform 400 which may strike the object 450 and be reflected to the light receiver 420 at a known and fixed position, denoted $(x_r, y_r)$. It may take a certain time, denoted $\tau_t$, for the emitted light to reach the object and another time, denoted $\tau_r$, to reach the light receiver 420. A total time delay, denoted $\tau$, from light source 415-a to light receiver 420 may be, for example, represented by $\tau = \tau_t + \tau_r$. The time delay $\tau$ is graphically shown in FIG. 4A as the phase difference of the emitted waveform, denoted $e_w$, as compared to the received waveform, denoted $r_w$.

In some demonstrative embodiments, the distance, denoted D, from the light source 415-*a* to the object 450 and back to the light receiver 420 may be, for example, calculated as follows:

$$D = c^* \tau \quad (3)$$

wherein c denotes the speed of light.

While not shown in FIG. 4B, a similar analysis may be performed with respect to light emitted from the second light source 415-*b*.

In some demonstrative embodiments, a relative positioning between vehicle 410 and object 450 may be determined, based on, for example, on the location of light source 415-*a*, the location of light source 415-*b*, the location of light receiver 420, and the distance D determined with respect to the light emitted by light source 415-*a* and the distance D determined with respect to the light emitted by light source 415-*b*.

In some demonstrative embodiments, vehicle 410 may include a controller, e.g., controller 111 (FIG. 1), to control light sources 415-*a* and 415-*b* to use different ranging frequencies for transmitting the IM optical signals 425-*a* and 425-*b* of the two-way positioning transmission.

For example, controller 111 (FIG. 1) may control light source 415-*a* to transmit the light signal 425-*a* over a first ranging frequency, and light source 415-*b* to transmit the light signal 425-*b* over a second ranging frequency, e.g., different from the first ranging frequency.

In some demonstrative embodiments, controller 111 (FIG. 1) may control light sources 415-*a* and 415-*b* to transmit signals 425-*a* and 425-*b* simultaneously.

In some demonstrative embodiments, controller 111 (FIG. 1) may control light sources 415-*a* and 415-*b* to transmit signals 425-*a* and 425-*b* sequentially.

Figure 5:
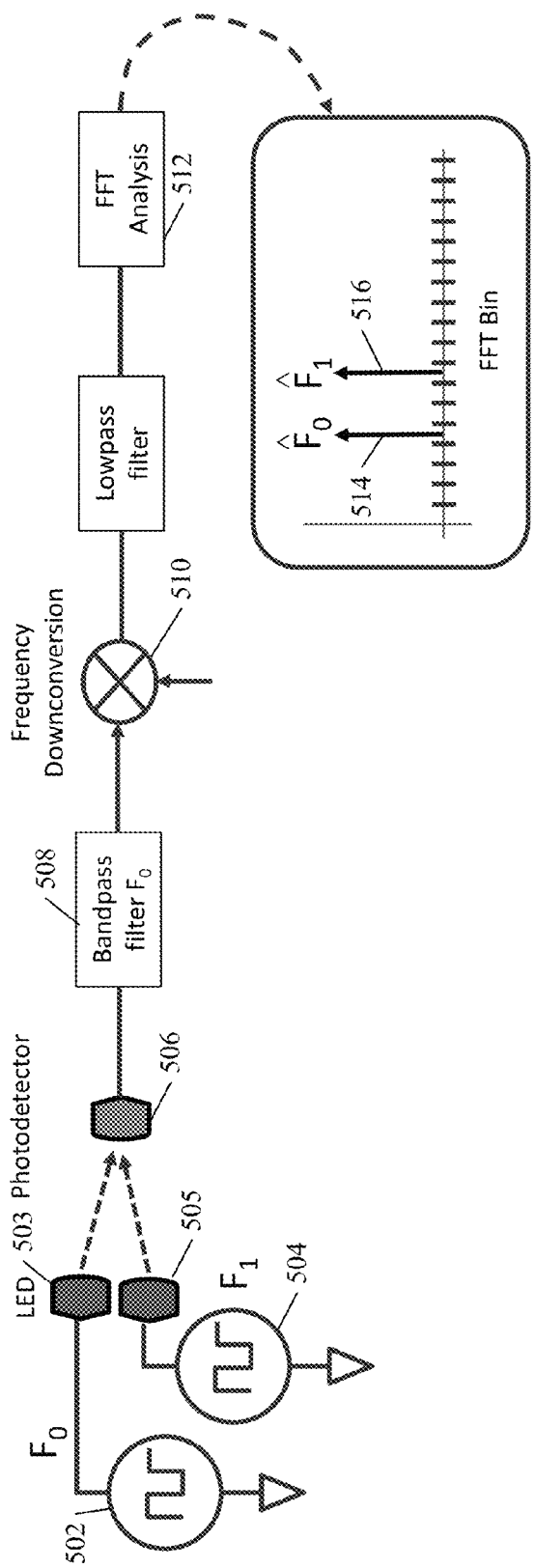
FIG. 5 is a schematic illustration of processing signals communicated over two different ranging frequencies, in accordance with some demonstrative embodiments.

Reference is now made to FIG. 5, which schematically illustrates processing of signals communicated over two different ranging frequencies, in accordance with some demonstrative embodiments.

As shown in FIG. 5, a first ranging signal 502 may be transmitted by a first light source, e.g., a LED 503, over a first ranging frequency, denoted $F_0$, and a second ranging signal 504 may be transmitted by a second light source, e.g., a LED 505, over a second ranging frequency, denoted $F_1$.

In one example, signals 502 and 504 may be transmitted by light transmitters of different vehicles, for example, as part of two one-way positioning transmissions, e.g., as described above.

In another example, signals 502 and 504 may be transmitted by light transmitters of the same vehicle, for example, as part of a two-way positioning transmission, e.g., as described above.

In some demonstrative embodiments, a light receiver, e.g., receiver 118 (FIG. 1), may receive light of both signals 502 and 504, e.g., simultaneously. For example, as shown in FIG. 5, a photodetector 506 may be illuminated by light of the combination of signals 502 and 504. Accordingly, photodetector 506 may detect a signal corresponding to a combination of signals 502 and 504. For example, photodetector 506 may perform the functionality of detector 119 (FIG. 1).

In some demonstrative embodiments, the detected signal may be filtered by a bandpass filter 508 and converted to a frequency domain, e.g., by a frequency downconverter 510.

As shown in FIG. 5, although both signals 502 and 504 illuminate photodetector 506 simultaneously, an FFT analysis of the detected signal may place the two signals in two FFT bins 514 and 516 corresponding to the first and second ranging frequencies used for transmitting signals 502 and 504. Accordingly, the signals of frequency bins 514 and 516 may be processed, e.g., independently and/or separately, to determine the information carried by signals 502 and 504.

Figure 6:
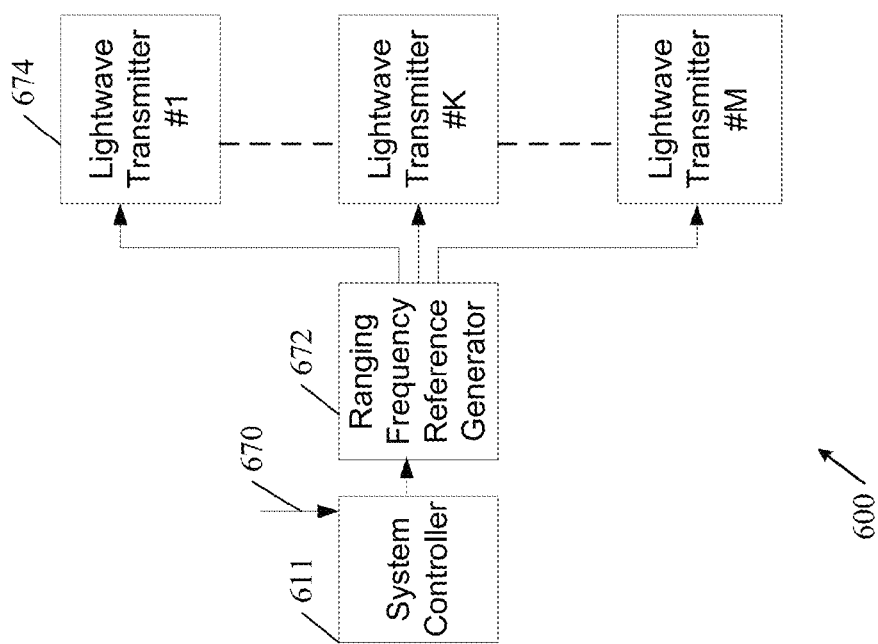
FIG. 6 is a schematic illustration of an optical transmitter, in accordance with some demonstrative embodiments.

Reference is made to FIG. 6, which schematically illustrates an optical transmitter 600, in accordance with some demonstrative embodiments. For example, optical transmitter 600 may perform the functionality of optical communication unit 112 (FIG. 1) for transmitting a vehicle-positioning transmission.

In some demonstrative embodiments, optical transmitter 600 may include one or more lightwave transmitters 674. For example, lightwave transmitter 674 may perform the functionality of light transmitters 116 (FIG. 1).

In some demonstrative embodiments, optical transmitter 600 may include a ranging frequency reference generator to generate one or more ranging frequencies to be used by the one or more lightwave transmitters 674, e.g., as described above.

In some demonstrative embodiments, optical transmitter 600 may be controlled by a controller 611. For example, controller 611 may perform the functionality of controller 111 (FIG. 1).

In some demonstrative embodiments, controller 611 may control optical transmitter 600 based, for example, on system input 670, e.g., received from one or more elements of vehicle 102 (FIG. 1). System input 670 may include, for example, information of an operating band to be used, e.g., one-way or two-way ranging; a band operating frequency; and/or information to be communicate by the ranging signals, e.g., as described above.

In some demonstrative embodiments, optical transmitter 600 may include a ranging frequency reference generator 672 to generate one or more ranging frequencies to be used by the one or more lightwave transmitters 674, e.g., as described above.

In some demonstrative embodiments, controller 611 may select the ranging reference frequency to be used by a k-th lightwave transmitter 674. For example, controller 611 may select the ranging reference frequency to be in the predefined ranging frequency band, e.g., as described above.

In some demonstrative embodiments, controller 611 may select the specific ranging frequency within the selected frequency band to be used by the k-th lightwave transmitter 674, for example, according to Equation 1, e.g., as described above.

In some demonstrative embodiments, controller 611 may control transmitters 674 to transmit the ranging signals over the one or more ranging frequencies generated by ranging frequency generator 672, e.g., as described above.

Figure 7:
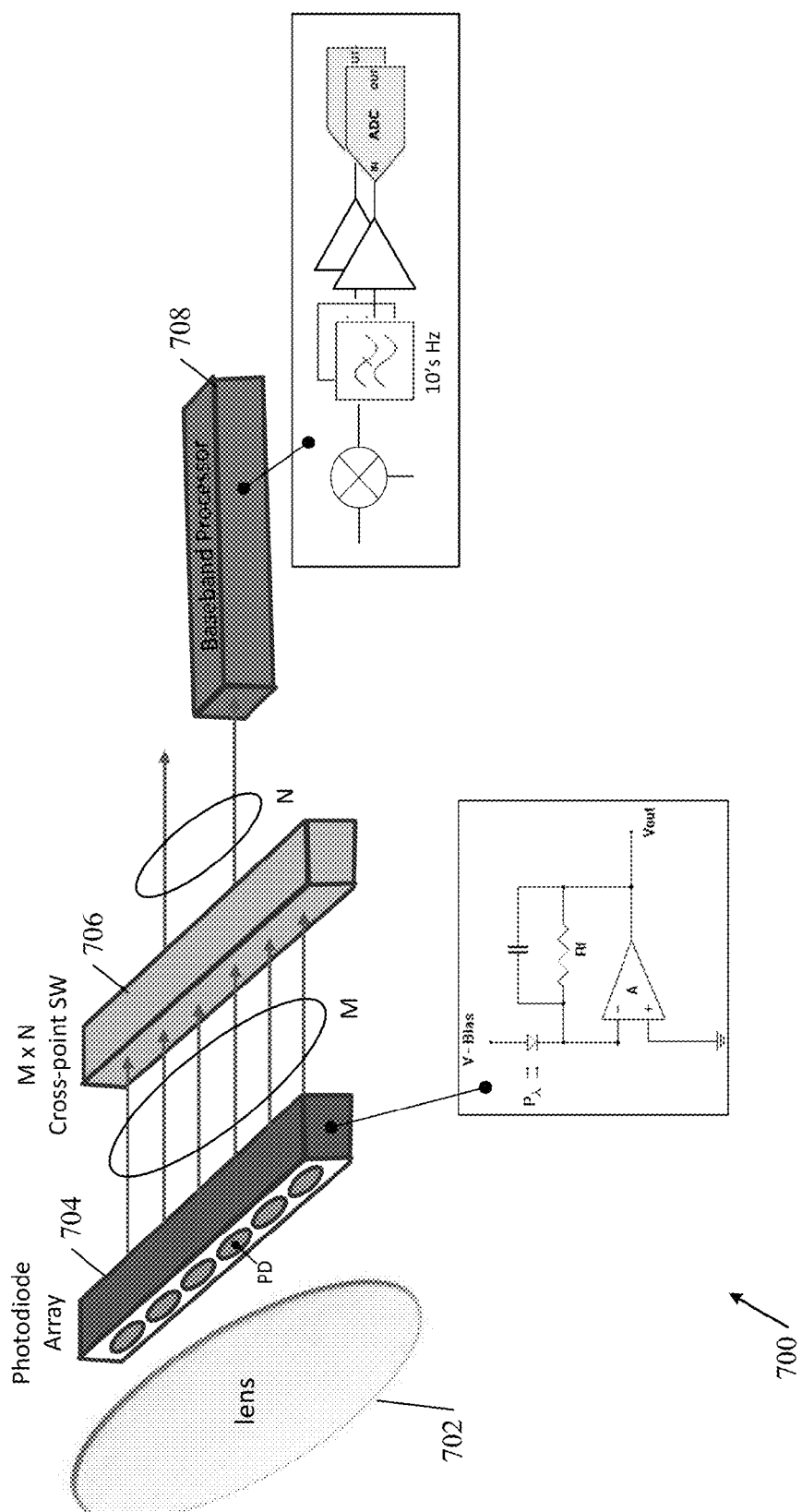
FIG. 7 is a schematic illustration of an optical receiver, in accordance with some demonstrative embodiments.

FIG. 7 is a schematic illustration of an optical receiver 700, in accordance with some demonstrative embodiments. For example, optical receiver 700 may perform the functionality of optical communication unit 112 (FIG. 1) for receiving a vehicle-positioning transmission.

In some demonstrative embodiments, optical receiver 700 may include an angle of arrival differentiating lens 702 followed by a non-imaging photodiode array 704. Array 704 may include multiple pixels.

In some demonstrative embodiments, optical receiver 700 may include a pixel processor 706 to scan the pixels of array 704 for pixels having active energy. Upon detecting a pixel having active energy, pixel processor 706 may assign the detected pixel to a baseband processor 708 for processing of the modulated signal received by the pixel. For example, optical receiver 700 may include a predefined number, denoted N, of baseband processors 708. In one example, controller 111 (FIG. 1) may perform the functionality of pixel processor 706.

Figure 8:
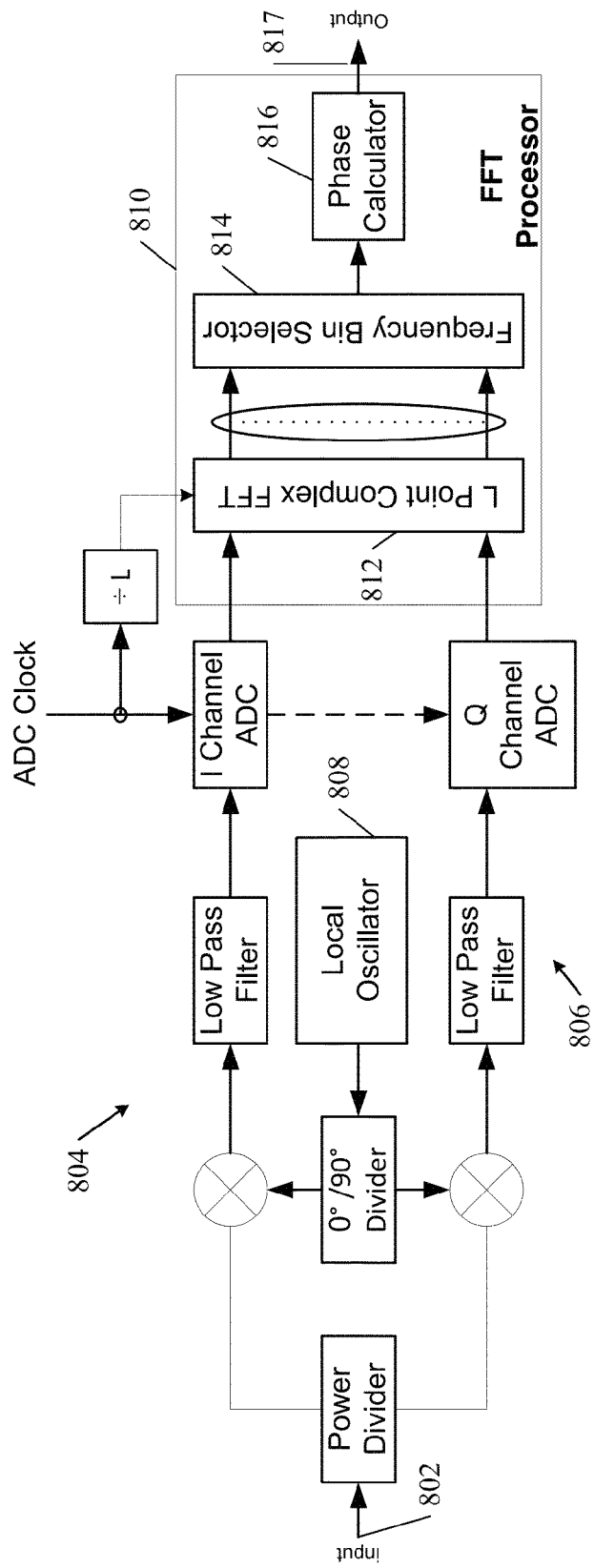
FIG. 8 is a schematic illustration of a receiver baseband processor, in accordance with some demonstrative embodiments.

FIG. 8 is a schematic illustration of a receiver baseband processor 800, in accordance with some demonstrative embodiments. For example, baseband processor 800 may perform the functionality of baseband processor 708 (FIG. 7).

In some demonstrative embodiments, baseband processor 800 may include a chain 804 and a chain 806 to process In-Phase (I) and Quadrature (Q) components of input signals 802, e.g., received from pixel processor 706 (FIG. 7).

In some demonstrative embodiments, baseband processor 800 may include a local oscillator 808 configured to generate an oscillator frequency corresponding to the ranging frequency band, e.g., the one-way and/or two-way frequency bands described above.

In some demonstrative embodiments, baseband processor 800 may include an FFT processor 810 to process the ranging signals of the vehicle-positioning transmission, e.g., as described below.

In some demonstrative embodiments, FFT processor 810 may include an FFT converter 812 to generate a plurality of FFT frequency bins, e.g., including L bins. For, example, each frequency bin may output a complex number, which may be expressed, for example, in polar form, as a magnitude and a phase.

In some demonstrative embodiments, FFT processor 810 may include a frequency bin selector 814 to select a frequency bin from the plurality of frequency bins. For example, controller 111 (FIG. 1) may control frequency bin selector 814 to select a frequency bin corresponding to the ranging frequency of the ranging signals, e.g., as described above.

In some demonstrative embodiments, FFT processor 810 may include a phase calculator 816 to calculate a phase 817 corresponding to the selected frequency bin.

Figure 9:
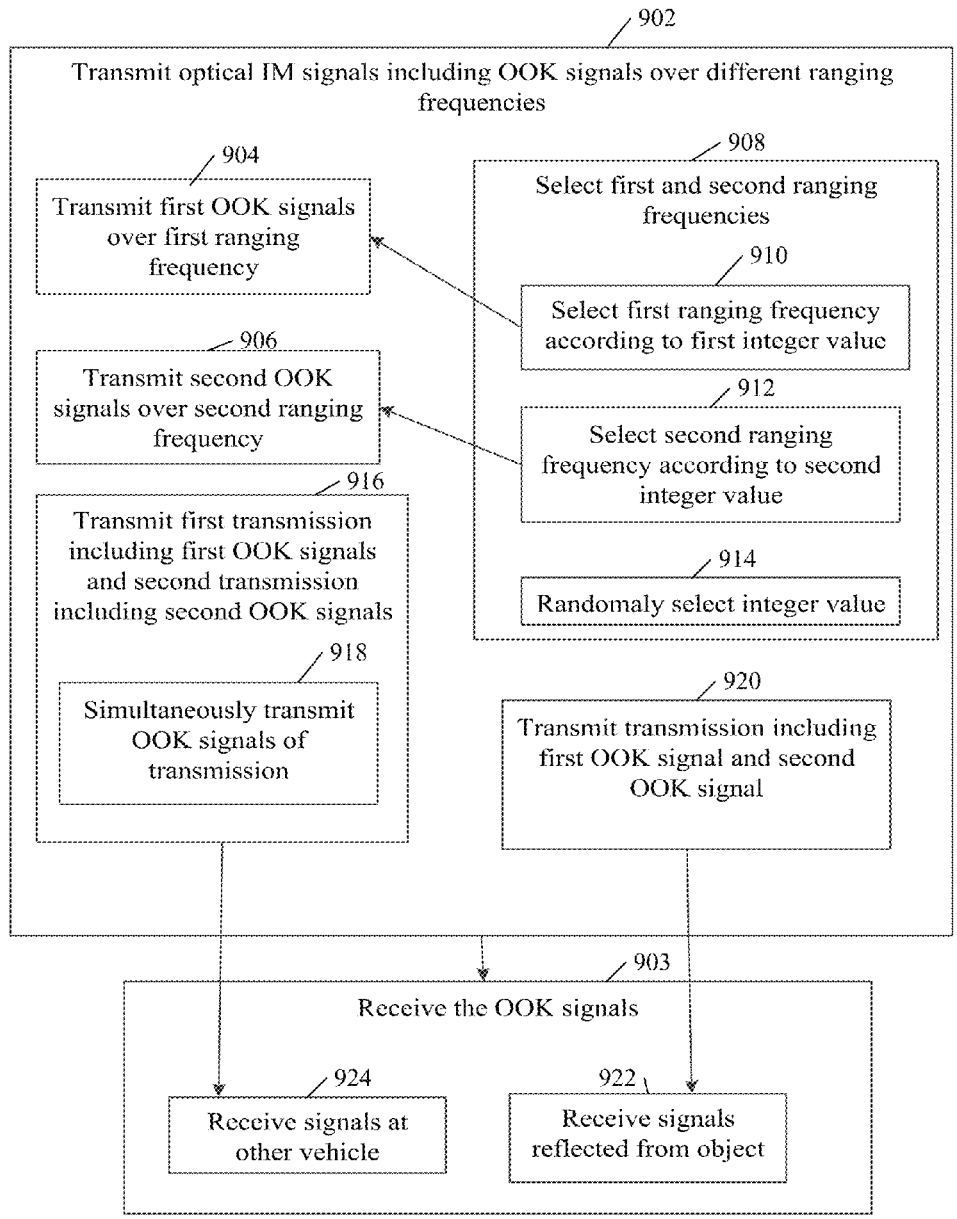
FIG. 9 is a schematic flow chart illustration of a method of communicating positioning transmissions, in accordance with some demonstrative embodiments.

Reference is made to FIG. 9, which schematically illustrates a method of communicating vehicle-positioning transmissions, in accordance with some demonstrative embodiments. In some demonstrative embodiments, one or more of the operations of the method of FIG. 9 may be performed by one or more elements of a system, e.g., system 100 (FIG. 1), a vehicle, e.g., vehicle 102 (FIG. 1) or vehicle 104 (FIG. 1), a positioning system, e.g., positioning system 110 (FIG. 1), an optical communication unit, e.g., optical communication unit 112 (FIG. 1), a controller, e.g., controller 111 (FIG. 1), and/or processor, e.g., processor 114 (FIG. 1), baseband processor 708 (FIG. 7), and/or baseband processor 800 (FIG. 8).

As indicated at block 902, the method may include transmitting from a vehicle IM optical signals including OOK signals of one or more vehicle-positioning transmissions over different ranging frequencies. For example, optical communication unit 112 (FIG. 1) may transmit signals 130 and/or 132 (FIG. 1), e.g., as described above.

As indicated at block 903, the method may include receiving the one or more vehicle-positioning transmissions. For example, the vehicle-positioning transmissions may be received by a receiver of vehicle 104 (FIG. 1), e.g., if the vehicle-positioning transmissions include one-way transmissions, or by receiver 118 (FIG. 1), e.g., if the vehicle-positioning transmissions include two-way transmissions.

As indicated at block 904, the method may include transmitting from the vehicle one or more first OOK signals over a first ranging frequency. For example, light transmitter 116 (FIG. 1) may transmit one or more first light signals over a first ranging frequency, e.g., as described above.

As indicated at block 906, the method may include transmitting from the vehicle one or more second OOK signals over a second ranging frequency, which is different from the first ranging frequency. For example, light transmitter 116 (FIG. 1) may transmit one or more second light signals over a second ranging frequency, e.g., as described above.

As indicated at block 908, the method may include selecting the first and second ranging frequencies according to a predefined frequency hopping size. For example, controller 111 (FIG. 1) may select the first and second ranging frequencies according to the predefined hopping size, e.g., according to Equation 1, as described above.

As indicated at block 910, the method may include selecting the first ranging frequency at an offset from a center frequency by a first integer multiple of the frequency hopping size.

As indicated at block 912, the method may include selecting the second ranging frequency at an offset from the center frequency by a second integer multiple of the frequency hopping size.

For example, controller 111 (FIG. 1) may select the first and second ranging frequencies based on the first and second integer multiples of the predefined hopping size, e.g., according to Equation 1, as described above.

As indicated at block 914, the method may include randomly selecting the first and second ranging frequencies. For example, controller 111 (FIG. 1) may randomly select the first and second ranging frequencies, for example, by randomly selecting first and second values of integer α, e.g., as described above.

As indicated at block 916, the method may include transmitting a first vehicle-positioning transmission including the first OOK signals, and transmitting a second vehicle-positioning transmission, subsequent to the first vehicle positioning transmission, including the second OOK signals. For example, light transmitter 116 (FIG. 1) may transmit a first plurality of OOK signals 130 (FIG. 1) of the first vehicle-positioning transmission, and a second plurality of OOK signals 130 (FIG. 1) of the second vehicle-positioning transmission, e.g., as described above.

As indicated at block 918, the method may include simultaneously transmitting a first plurality of optical signals including the first OOK signals of the first vehicle-positioning transmission over the first ranging frequency, and simultaneously transmitting a second plurality of optical signals including the second OOK signals of the second vehicle-positioning transmission over the second ranging frequency. For example, signal sources 201A, 201B and 201C (FIG. 2A) may transmit the first vehicle-positioning transmission to vehicle 200A (FIG. 2A) by simultaneously transmitting a first set of signals 218A, 218B and 218C (FIG. 2B) over the first ranging frequency; and signal sources 201A, 201B and 201C (FIG. 2A) may transmit the second vehicle-positioning transmission to vehicle 200A (FIG. 2A) by simultaneously transmitting a second set of signals 218A, 218B and 218C (FIG. 2B) over the second ranging frequency, e.g., as described above.

As indicated at block 924, the method may include receiving at least one of the first and second vehicle positioning transmissions at one or more other vehicles. For example, the light receiver of vehicle 104 (FIG. 1) may receive the vehicle-positioning transmissions transmitted from vehicle 102 (FIG. 1), e.g., as described above.

As indicated at block 920, the method may include transmitting a vehicle-positioning transmission by transmitting a first optical signal including a first OOK signal over the first ranging frequency, and transmitting a second optical signal including a second OOK signal over the second ranging frequency. For example, light transmitter 116 (FIG. 1) may transmit a two-way positioning transmission by transmitting a first optical signal 132 (FIG. 1) over the first ranging frequency and a second light signal 132 (FIG. 1) over the second ranging frequency, e.g., as described above.

As indicated at block 922, the method may include receiving the first and second optical signals reflected from an object. For example, light receiver 118 (FIG. 1) may receive reflections 134 (FIG. 1) reflected by object 106 (FIG. 1), e.g., as described above.

Figure 10:
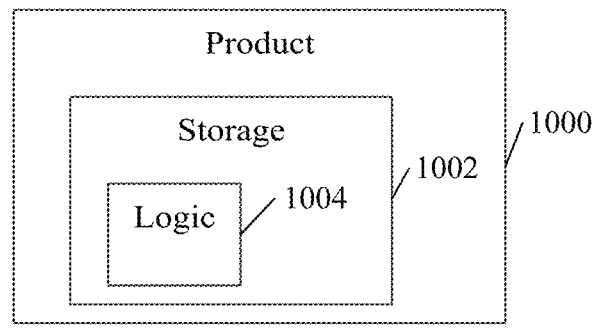
FIG. 10 is a schematic illustration of a product of manufacture, in accordance with some demonstrative embodiments.

Reference is made to FIG. 10, which schematically illustrates a product of manufacture 1000, in accordance with some demonstrative embodiments. Product 1000 may include a non-transitory machine-readable storage medium 1002 to store logic 1004, which may be used, for example, to perform at least part of the functionality of a positioning system, e.g., positioning system 110 (FIG. 1), an optical communication unit, e.g., optical communication unit 112 (FIG. 1), a controller, e.g., controller 111 (FIG. 1), and/or a processor, e.g., processor 114 (FIG. 1), baseband processor 708 (FIG. 7), and/or baseband processor 800 (FIG. 8), and/or to perform one or more operations of the method of FIG. 9. The phrase "non-transitory machine-readable medium" is directed to include all computer-readable media, with the sole exception being a transitory propagating signal.

In some demonstrative embodiments, product 1000 and/or machine-readable storage medium 1002 may include one or more types of computer-readable storage media capable of storing data, including volatile memory, non-volatile memory, removable or non-removable memory, erasable or non-erasable memory, writeable or re-writeable memory, and the like. For example, machine-readable storage medium 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a location detection apparatus, the apparatus comprising a controller to control at least one light transmitter to transmit from a mobile object Intensity-Modulated (IM) optical signals including On-Off-Keying (OOK) signals of one or more positioning transmissions, the controller is to control the at least one light transmitter to transmit from the mobile object one or more first OOK signals over a first ranging frequency, and to transmit from the mobile device one or more second OOK signals over a second ranging frequency, the second ranging frequency is different from the first ranging frequency.

Example 2 includes the subject matter of Example 1 and optionally, wherein the first and second ranging frequencies are selected according to a predefined frequency hopping size.

Example 3 includes the subject matter of Example 2 and optionally, wherein the first ranging frequency is offset from a center frequency by a first integer multiple of the frequency hopping size, and wherein the second ranging frequency is offset from the center frequency by a second integer multiple of the frequency hopping size.

Example 4 includes the subject matter of any one of Examples 1-3 and optionally, wherein the first and second ranging frequencies are randomly selected.

Example 5 includes the subject matter of any one of Examples 1-4 and optionally, wherein the first OOK signals comprise signals of a first positioning transmission, and the second OOK signals comprise signals of a second positioning transmission subsequent to the first positioning transmission.

Example 6 includes the subject matter of Example 5 and optionally, wherein the at least one light transmitter comprises a plurality of light transmitters, and wherein the controller is to control the plurality of light transmitters to simultaneously transmit the signals of the first positioning transmission over the first ranging frequency, and to control the plurality of light transmitters to simultaneously transmit the signals of the second positioning transmission over the second ranging frequency.

Example 7 includes the subject matter of any one of Examples 1-4 and optionally, wherein the at least one light transmitter comprises at least first and second light transmitters, and wherein the controller is to control the first and second light transmitters to transmit a positioning transmission by controlling the first light transmitter to transmit the first OOK signals over the first ranging frequency and the second light transmitter to transmit the second OOK signals over the second ranging frequency.

Example 8 includes the subject matter of Example 7 and optionally, wherein the controller is to control the first and second light transmitters to transmit the first and second OOK signals simultaneously.

Example 9 includes the subject matter of Example 7 or 8 and optionally, comprising at least one light receiver to receive the first and second OOK signals reflected from an object.

Example 10 includes the subject matter of Example 9 and optionally, comprising a lensed detector array to map an angle of arrival of the first and second OOK signals to pixel locations on an image plane.

Example 11 includes the subject matter of any one of Examples 1-4 and optionally, wherein the first and second OOK signals comprise one-way positioning signals transmitted from a first mobile object to a second mobile object.

Example 12 includes the subject matter of any one of Examples 1-4 and optionally, wherein the first and second OOK signals comprise two-way positioning signals transmitted by the mobile object, reflected by an object, and received back by the mobile object.

Example 13 includes the subject matter of any one of Examples 1-12 and optionally, wherein the light transmitter comprises a light emitting diode (LED) or a laser diode.

Example 14 includes the subject matter of any one of Examples 1-13 and optionally, wherein the mobile object comprises a vehicle, and wherein the positioning transmissions comprise vehicle-positioning transmissions.

Example 15 includes a vehicle positioning system comprising at least one light transmitter; and a controller to control the light transmitter to transmit from a vehicle Intensity-Modulated (IM) optical signals including On-Off-Keying (OOK) signals of one or more vehicle-positioning transmissions, the controller is to control the at least one light transmitter to transmit from the vehicle one or more first OOK signals over a first ranging frequency, and to transmit from the vehicle one or more second OOK signals over a second ranging frequency, the second ranging frequency is different from the first ranging frequency.

Example 16 includes the subject matter of Example 15 and optionally, wherein the first and second ranging frequencies are selected according to a predefined frequency hopping size.

Example 17 includes the subject matter of Example 16 and optionally, wherein the first ranging frequency is offset from a center frequency by a first integer multiple of the frequency hopping size, and wherein the second ranging frequency is offset from the center frequency by a second integer multiple of the frequency hopping size.

Example 18 includes the subject matter of any one of Examples 15-17 and optionally, wherein the first and second ranging frequencies are randomly selected.

Example 19 includes the subject matter of any one of Examples 15-18 and optionally, wherein the first OOK signals comprise signals of a first vehicle-positioning transmission, and the second OOK signals comprise signals of a second vehicle-positioning transmission subsequent to the first vehicle positioning transmission.

Example 20 includes the subject matter of Example 19 and optionally, wherein the at least one light transmitter comprises a plurality of light transmitters, and wherein the controller is to control the plurality of light transmitters to simultaneously transmit the signals of the first vehicle-positioning transmission over the first ranging frequency, and to control the plurality of light transmitters to simultaneously transmit the signals of the second vehicle-positioning transmission over the second ranging frequency.

Example 21 includes the subject matter of any one of Examples 15-18 and optionally, wherein the at least one light transmitter comprises at least first and second light transmitters, and wherein the controller is to control the first and second light transmitters to transmit a vehicle-positioning transmission by controlling the first light transmitter to transmit the first OOK signals over the first ranging frequency and the second light transmitter to transmit the second OOK signals over the second ranging frequency.

Example 22 includes the subject matter of Example 21 and optionally, wherein the controller is to control the first and second light transmitters to transmit the first and second OOK signals simultaneously.

Example 23 includes the subject matter of Example 21 or 22 and optionally, comprising at least one light receiver to receive the first and second OOK signals reflected from an object.

Example 24 includes the subject matter of Example 23 and optionally, comprising a lensed detector array to map an angle of arrival of the first and second OOK signals to pixel locations on an image plane.

Example 25 includes the subject matter of any one of Examples 15-18 and optionally, wherein the first and second OOK signals comprise one-way positioning signals transmitted from a first vehicle to a second vehicle.

Example 26 includes the subject matter of any one of Examples 15-18 and optionally, wherein the first and second OOK signals comprise two-way positioning signals transmitted by the vehicle, reflected by an object, and received back by the vehicle.

Example 27 includes the subject matter of any one of Examples 15-26 and optionally, wherein the light transmitter comprises a light emitting diode (LED) or a laser diode.

Example 28 includes the subject matter of any one of Examples 15-27 and optionally, comprising the vehicle.

Example 29 includes a method comprising transmitting from a mobile object Intensity-Modulated (IM) optical signals including On-Off-Keying (OOK) signals of one or more positioning transmissions, the transmitting including transmitting from the mobile object one or more first OOK signals over a first ranging frequency, and transmitting from the mobile object one or more second OOK signals over a second ranging frequency, the second ranging frequency is different from the first ranging frequency.

Example 30 includes the subject matter of Example 29 and optionally, comprising selecting the first and second ranging frequencies according to a predefined frequency hopping size.

Example 31 includes the subject matter of Example 30 and optionally, wherein the first ranging frequency is offset from a center frequency by a first integer multiple of the frequency hopping size, and wherein the second ranging frequency is offset from the center frequency by a second integer multiple of the frequency hopping size.

Example 32 includes the subject matter of any one of Examples 29-31 and optionally, comprising randomly selecting the first and second ranging frequencies.

Example 33 includes the subject matter of any one of Examples 29-32 and optionally, comprising transmitting a first positioning transmission including the first OOK signals, and transmitting a second positioning transmission, subsequent to the first positioning transmission, including the second OOK signals.

Example 34 includes the subject matter of Example 33 and optionally, comprising simultaneously transmitting a first plurality of optical signals including the first OOK signals of the first positioning transmission over the first ranging frequency, and simultaneously transmitting a second plurality of optical signals including the second OOK signals of the second positioning transmission over the second ranging frequency.

Example 35 includes the subject matter of any one of Examples 29-32 and optionally, comprising transmitting a positioning transmission by transmitting a first optical signal including a first OOK signal over the first ranging frequency, and transmitting a second optical signal including a second OOK signal over the second ranging frequency.

Example 36 includes the subject matter of Example 35 and optionally, comprising transmitting the first and second optical signals simultaneously.

Example 37 includes the subject matter of Example 35 or 36 and optionally, comprising receiving the first and second optical signals reflected from an object.

Example 38 includes the subject matter of Example 37 and optionally, comprising mapping an angle of arrival of the optical signals to pixel locations on an image plane.

Example 39 includes the subject matter of any one of Examples 29-32 and optionally, wherein the first and second OOK signals comprise one-way positioning signals transmitted from a first mobile object to a second mobile object.

Example 40 includes the subject matter of any one of Examples 29-32 and optionally, wherein the first and second OOK signals comprise two-way positioning signals transmitted by the mobile object, reflected by an object, and received back by the mobile object.

Example 41 includes the subject matter of any one of Examples 29-40 and optionally, wherein transmitting the positioning transmissions comprises transmitting the positioning transmissions by a light emitting diode (LED) or a laser diode.

Example 42 includes the subject matter of any one of Examples 29-41 and optionally, wherein the mobile object comprises a vehicle, and wherein the positioning transmissions comprise vehicle-positioning transmissions.

Example 43 includes a product including a non-transitory storage medium having stored thereon instructions that, when executed by a machine, result in transmitting from a vehicle Intensity-Modulated (IM) optical signals including On-Off-Keying (OOK) signals of one or more vehicle-positioning transmissions, the transmitting including transmitting from the vehicle one or more first OOK signals over a first ranging frequency, and transmitting from the vehicle one or more second OOK signals over a second ranging frequency, the second ranging frequency is different from the first ranging frequency.

Example 44 includes the subject matter of Example 43 and optionally, wherein the instructions result in selecting the first and second ranging frequencies according to a predefined frequency hopping size.

Example 45 includes the subject matter of Example 44 and optionally, wherein the first ranging frequency is offset from a center frequency by a first integer multiple of the frequency hopping size, and wherein the second ranging frequency is offset from the center frequency by a second integer multiple of the frequency hopping size.

Example 46 includes the subject matter of any one of Examples 43-45 and optionally, wherein the instructions result in randomly selecting the first and second ranging frequencies.

Example 47 includes the subject matter of any one of Examples 43-46 and optionally, wherein the instructions result in transmitting a first vehicle-positioning transmission including the first OOK signals, and transmitting a second vehicle-positioning transmission, subsequent to the first vehicle positioning transmission, including the second OOK signals.

Example 48 includes the subject matter of Example 47 and optionally, wherein the instructions result in simultaneously transmitting a first plurality of optical signals including the first OOK signals of the first vehicle-positioning transmission over the first ranging frequency, and simultaneously transmitting a second plurality of optical signals including the second OOK signals of the second vehicle-positioning transmission over the second ranging frequency.

Example 49 includes the subject matter of any one of Examples 43-46 and optionally, wherein the instructions result in transmitting a vehicle-positioning transmission by transmitting a first optical signal including a first OOK signal over the first ranging frequency, and transmitting a second optical signal including a second OOK signal over the second ranging frequency.

Example 50 includes the subject matter of Example 49 and optionally, wherein the instructions result in transmitting the first and second optical signals simultaneously.

Example 51 includes the subject matter of Example 49 or 50 and optionally, wherein the instructions result in receiving the first and second optical signals reflected from an object.

Example 52 includes the subject matter of Example 51 and optionally, wherein the instructions result in mapping an angle of arrival of the optical signals to pixel locations on an image plane.

Example 53 includes the subject matter of any one of Examples 43-46 and optionally, wherein the first and second OOK signals comprise one-way positioning signals transmitted from a first vehicle to a second vehicle.

Example 54 includes the subject matter of any one of Examples 43-46 and optionally, wherein the first and second OOK signals comprise two-way positioning signals transmitted by the vehicle, reflected by an object, and received back by the vehicle.

Example 55 includes the subject matter of any one of Examples 43-54 and optionally, wherein the instructions result in transmitting the vehicle-positioning transmissions by a light emitting diode (LED) or a laser diode.

Example 56 includes an apparatus of wireless communication, the apparatus comprising means for transmitting from a vehicle Intensity-Modulated (IM) optical signals including On-Off-Keying (OOK) signals of one or more vehicle-positioning transmissions, the means for transmitting including means for transmitting from the vehicle one or more first OOK signals over a first ranging frequency, and means for transmitting from the vehicle one or more second OOK signals over a second ranging frequency, the second ranging frequency is different from the first ranging frequency.

Example 57 includes the subject matter of Example 56 and optionally, comprising means for selecting the first and second ranging frequencies according to a predefined frequency hopping size.

Example 58 includes the subject matter of Example 57 and optionally, wherein the first ranging frequency is offset from a center frequency by a first integer multiple of the frequency hopping size, and wherein the second ranging frequency is offset from the center frequency by a second integer multiple of the frequency hopping size.

Example 59 includes the subject matter of any one of Examples 56-58 and optionally, comprising means for randomly selecting the first and second ranging frequencies.

Example 60 includes the subject matter of any one of Examples 56-59 and optionally, comprising means for transmitting a first vehicle-positioning transmission including the first OOK signals, and means for transmitting a second vehicle-positioning transmission, subsequent to the first vehicle positioning transmission, including the second OOK signals.

Example 61 includes the subject matter of Example 60 and optionally, comprising means for simultaneously transmitting a first plurality of optical signals including the first OOK signals of the first vehicle-positioning transmission over the first ranging frequency, and simultaneously transmitting a second plurality of optical signals including the second OOK signals of the second vehicle-positioning transmission over the second ranging frequency.

Example 62 includes the subject matter of any one of Examples 56-59 and optionally, comprising means for transmitting a vehicle-positioning transmission by transmitting a first optical signal including a first OOK signal over the first ranging frequency, and transmitting a second optical signal including a second OOK signal over the second ranging frequency.

Example 63 includes the subject matter of Example 62 and optionally, comprising means for transmitting the first and second optical signals simultaneously.

Example 64 includes the subject matter of Example 62 or 63 and optionally, comprising means for receiving the first and second optical signals reflected from an object.

Example 65 includes the subject matter of Example 64 and optionally, comprising means for mapping an angle of arrival of the optical signals to pixel locations on an image plane.

Example 66 includes the subject matter of any one of Examples 56-59 and optionally, wherein the first and second OOK signals comprise one-way positioning signals transmitted from a first vehicle to a second vehicle.

Example 67 includes the subject matter of any one of Examples 56-59 and optionally, wherein the first and second OOK signals comprise two-way positioning signals transmitted by the vehicle, reflected by an object, and received back by the vehicle.

Example 68 includes the subject matter of any one of Examples 56-67 and optionally, wherein the means for transmitting the vehicle-positioning transmissions comprises means for transmitting the vehicle-positioning transmissions by a light emitting diode (LED) or a laser diode.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. An apparatus comprising:
a controller to control at least one light transmitter to transmit from a mobile object Intensity-Modulated (IM) optical signals including On-Off-Keying (OOK) signals of one or more positioning transmissions, which are configured for determining a relative positioning between the mobile object and at least one other object, said controller is to control said at least one light transmitter to transmit from said mobile object one or more first OOK signals over a first ranging frequency, and to transmit from said mobile device one or more second OOK signals over a second ranging frequency, said second ranging frequency is different from said first ranging frequency.

2. The apparatus of claim 1, wherein said first and second ranging frequencies are selected according to a predefined frequency hopping size.

3. The apparatus of claim 2, wherein said first ranging frequency is offset from a center frequency by a first integer multiple of said frequency hopping size, and wherein said second ranging frequency is offset from said center frequency by a second integer multiple of said frequency hopping size.

4. The apparatus of claim 1, wherein said first and second ranging frequencies are randomly selected.

5. The apparatus of claim 1, wherein said first OOK signals comprise signals of a first positioning transmission, and said second OOK signals comprise signals of a second positioning transmission subsequent to said first positioning transmission.

6. The apparatus of claim 5, wherein said at least one light transmitter comprises a plurality of light transmitters, and wherein said controller is to control said plurality of light transmitters to simultaneously transmit the signals of the first positioning transmission over said first ranging frequency, and to control said plurality of light transmitters to simultaneously transmit the signals of the second positioning transmission over said second ranging frequency.

7. The apparatus of claim 1, wherein said at least one light transmitter comprises at least first and second light transmitters, and wherein said controller is to control said first and second light transmitters to transmit a positioning transmission by controlling said first light transmitter to transmit said first OOK signals over said first ranging frequency and said second light transmitter to transmit said second OOK signals over said second ranging frequency.

8. The apparatus of claim 7, wherein said controller is to control said first and second light transmitters to transmit said first and second OOK signals simultaneously.

9. The apparatus of claim 7, comprising at least one light receiver to receive said first and second OOK signals reflected from said other object.

10. The apparatus of claim 9, comprising a lensed detector array to map an angle of arrival of said first and second OOK signals to pixel locations on an image plane.

11. The apparatus of claim 1, wherein said mobile object comprises a first mobile object, and said other object comprises a second mobile object, and wherein said first and second OOK signals comprise one-way positioning signals transmitted from the first mobile object to the second mobile object.

12. The apparatus of claim 1, wherein said first and second OOK signals comprise two-way positioning signals transmitted by said mobile object, reflected by said other object, and received back by the mobile object.

13. The apparatus of claim 1, wherein said light transmitter comprises a light emitting diode (LED) or a laser diode.

14. The apparatus of claim 1, wherein said mobile object comprises a vehicle, and wherein said positioning transmissions comprise vehicle-positioning transmissions.

15. A vehicle positioning system comprising:
at least one light transmitter; and
a controller to control said light transmitter to transmit from a vehicle Intensity-Modulated (IM) optical signals including On-Off-Keying (OOK) signals of one or more vehicle-positioning transmissions, which are configured for determining a relative positioning between the vehicle and at least one object, said controller is to control said at least one light transmitter to transmit from said vehicle one or more first OOK signals over a first ranging frequency, and to transmit from said vehicle one or more second OOK signals over a second ranging frequency, said second ranging frequency is different from said first ranging frequency.

16. The system of claim 15, wherein said first and second ranging frequencies are selected according to a predefined frequency hopping size.

17. The system of claim 15, wherein said first and second ranging frequencies are randomly selected.

18. The system of claim 15, wherein said first OOK signals comprise signals of a first vehicle-positioning transmission, and said second OOK signals comprise signals of a second vehicle-positioning transmission subsequent to said first vehicle positioning transmission.

19. The system of claim 15, wherein said at least one light transmitter comprises at least first and second light transmitters, and wherein said controller is to control said first and second light transmitters to transmit a vehicle-positioning transmission by controlling said first light transmitter to transmit said first OOK signals over said first ranging frequency and said second light transmitter to transmit said second OOK signals over said second ranging frequency.

20. The system of claim 19, comprising at least one light receiver to receive said first and second OOK signals reflected from said object.

21. The system of claim 15, including said vehicle.

22. A method comprising:
transmitting from a mobile object Intensity-Modulated (IM) optical signals including On-Off-Keying (OOK) signals of one or more positioning transmissions, which are configured for determining a relative positioning between the mobile object and at least one other object, said transmitting including transmitting from said mobile object one or more first OOK signals over a first ranging frequency, and transmitting from said mobile object one or more second OOK signals over a second ranging frequency, said second ranging frequency is different from said first ranging frequency.

23. The method of claim 22, comprising transmitting a first positioning transmission including said first OOK signals, and transmitting a second positioning transmission, subsequent to said first positioning transmission, including said second OOK signals.

24. The method of claim 22, comprising transmitting a positioning transmission by transmitting a first optical signal including a first OOK signal over said first ranging frequency, and transmitting a second optical signal including a second OOK signal over said second ranging frequency.

25. The method of claim 22, wherein the mobile object comprises a vehicle, and wherein said positioning transmissions comprise vehicle-positioning transmissions.

26. A product including a non-transitory storage medium having stored thereon instructions that, when executed by a machine, result in:
transmitting from a vehicle Intensity-Modulated (IM) optical signals including On-Off-Keying (OOK) signals of one or more vehicle-positioning transmissions, which are configured for determining a relative positioning between the vehicle and at least one object, said transmitting including transmitting from said vehicle one or more first OOK signals over a first ranging frequency, and transmitting from said vehicle one or more second OOK signals over a second ranging frequency, said second ranging frequency is different from said first ranging frequency.

27. The product of claim 26, wherein said instructions result in selecting said first and second ranging frequencies according to a predefined frequency hopping size.

28. The product of claim 26, wherein said instructions result in transmitting a first vehicle-positioning transmission including said first OOK signals, and transmitting a second vehicle-positioning transmission, subsequent to said first vehicle positioning transmission, including said second OOK signals.

29. The product of claim 26, wherein said instructions result in transmitting a vehicle-positioning transmission by transmitting a first optical signal including a first OOK signal over said first ranging frequency, and transmitting a second optical signal including a second OOK signal over said second ranging frequency.

30. The product of 29, wherein said instructions result in receiving said first and second optical signals reflected from said object.

* * * * *